United States Patent
Wu et al.

(10) Patent No.: US 12,540,195 B2
(45) Date of Patent: Feb. 3, 2026

(54) CS1-ANTIBODY AND ANTI-CS1-CAR-T CELLS

(71) Applicants: ProMab Biotechnologies, Inc., Richmond, CA (US); Forevertek Biotechnology Co., Ltd, Changsha (CN)

(72) Inventors: Lijun Wu, Berkeley, CA (US); Vita Golubovskaya, Pinole, CA (US)

(73) Assignees: ProMab Biotechnologies, Inc., Richmond, CA (US); Forevertek Biotechnology Co., Ltd, Changsha (CN)

( * ) Notice: Subject to any disclaimer, the term of this patent is extended or adjusted under 35 U.S.C. 154(b) by 452 days.

(21) Appl. No.: 18/040,408

(22) PCT Filed: Aug. 2, 2021

(86) PCT No.: PCT/US2021/044184
§ 371 (c)(1),
(2) Date: Feb. 2, 2023

(87) PCT Pub. No.: WO2022/031602
PCT Pub. Date: Feb. 10, 2022

(65) Prior Publication Data
US 2023/0295331 A1 Sep. 21, 2023

Related U.S. Application Data

(60) Provisional application No. 63/061,912, filed on Aug. 6, 2020.

(51) Int. Cl.
*C07K 16/28* (2006.01)
*C07K 14/725* (2006.01)

(52) U.S. Cl.
CPC ...... *C07K 16/2896* (2013.01); *C07K 14/7051* (2013.01); *C07K 2317/622* (2013.01); *C07K 2319/03* (2013.01)

(58) Field of Classification Search
CPC ............ C07K 16/2896; C07K 14/7051; C07K 2317/622; C07K 2319/03; C07K 16/2803; C07K 16/2878; C07K 2317/31; C07K 2319/70; C07K 2317/92; C07K 2319/33
See application file for complete search history.

(56) References Cited

U.S. PATENT DOCUMENTS

| | | | |
|---|---|---|---|
| 2005/0025763 A1* | 2/2005 | Williams | A61P 37/00 530/388.22 |
| 2016/0075784 A1 | 3/2016 | Yu et al. | |
| 2016/0257750 A1* | 9/2016 | Andre | A61P 35/00 |
| 2017/0233480 A1 | 8/2017 | Lai et al. | |
| 2019/0085077 A1 | 3/2019 | Cornen et al. | |

FOREIGN PATENT DOCUMENTS

WO 2019036724 A2 2/2019

OTHER PUBLICATIONS

Abate-Daga et al. "CAR models: next-generation CAR modifications for enhanced T-cell function" Mol. Ther. Oncolytics, 2016, vol. 3. 7 pages.
Chu et al. "CS1-specific chimeric antigen receptor (CAR)-engineered natural killer cells enhance in vitro and in vivo antitumor activity against human multiple myeloma" Leukemia; 2014; vol. 28(4), pp. 917-927.
International Search Report for PCT Application No. PCT/US2021/044184. Mail Date: Nov. 17, 2021. 2 pages.
Malaer et al. "CS1 (SLAMF7, CD319) is an effective immunotherapeutic target for multiple myeloma" Am. J. Cancer Res., 2017, vol. 7(8); pp. 1637-1641.

* cited by examiner

*Primary Examiner* — Nelson B Moseley, II
*Assistant Examiner* — Josephine K Darpolor
(74) *Attorney, Agent, or Firm* — Perkins Coie LLP; Viola Kung

(57) ABSTRACT

The present invention is directed to a monoclonal anti-human CS1 clone 7A8D5 antibody or a single-chain variable fragment (scFv), comprising VH having the amino acid of SEQ ID NO: 4 and VL having the amino acid of SEQ ID NO: 5. The present invention is also directed to a chimeric antigen receptor fusion protein comprising from N-terminus to C-terminus: (i) CS1 scFv of the present invention, (ii) a transmembrane domain, (iii) at least one co-stimulatory domains, and (iv) an activating domain.

10 Claims, 12 Drawing Sheets
Specification includes a Sequence Listing.

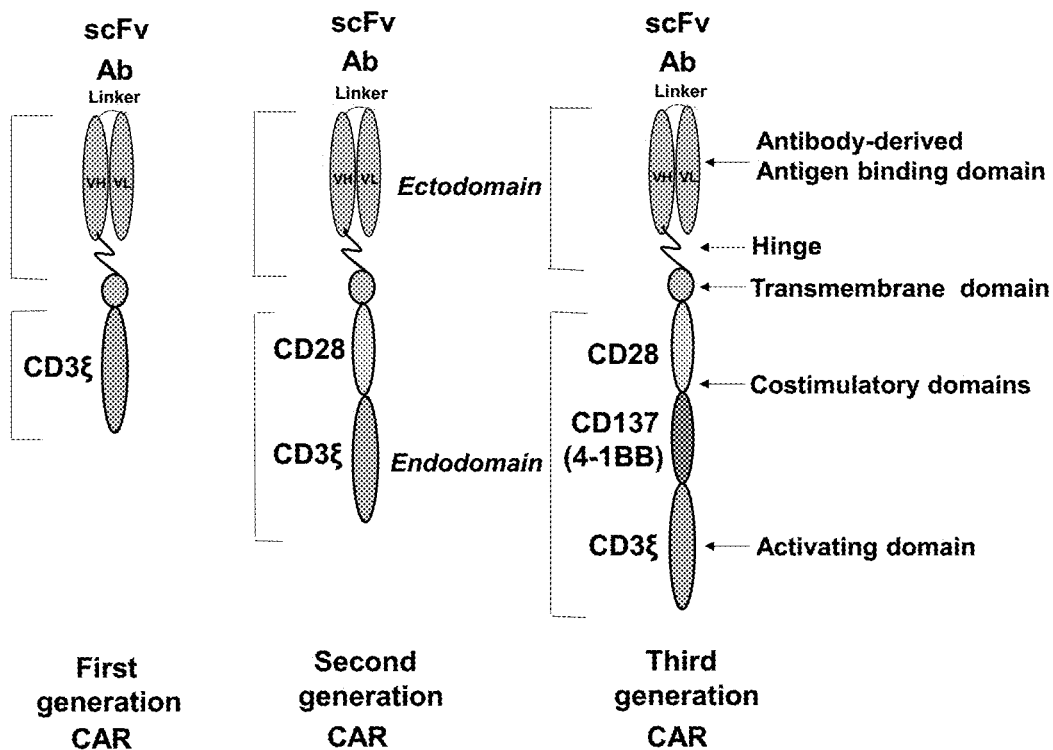

Figure 1

```
          10         20         30         40         50
MAGSPTCLTL IYILWQLTGS AASGPVKELV GSVGGAVTFP LKSKVKQVDS
          60         70         80         90        100
IVWTFNTTPL VTIQPEGGTI IVTQNRNRER VDFPDGGYSL KLSKLKKNDS
         110        120        130        140        150
GIYYVGIYSS SLQQPSTQEY VLHVYEHLSK PKVTMGLQSN KNGTCVTNLT
         160        170        180        190        200
CCMEHGEEDV IYTWKALGQA ANESHNGSIL PISWRWGESD MTFICVARNP
         210        220        230        240        250
VSRNFSSPIL ARKLCEGAAD DPDSSMVLLC LLLVPLLLSL FVLGLFLWFL
         260        270        280        290        300
KRERQEEYIE EKKRVDICRE TPNICPHSGE NTEYDTIPHT NRTILKEDPA
         310        320        330
NTVYSTVEIP KKMENPHSLL TMPDTPRLFA YENVI
```

Figure 2

CS1-ANTIBODY AND ANTI-CS1-CAR-T CELLS

REFERENCE TO SEQUENCE LISTING, TABLE OR COMPUTER PROGRAM

The Sequence Listing is concurrently submitted herewith with the specification as an ASCII formatted text file via EFS-Web with a file name of SequenceListing.txt with a creation date of Jul. 30, 2021, and a size of 25.2 kilobytes. The Sequence Listing filed via EFS-Web is part of the specification and is hereby incorporated in its entirety by reference herein.

FIELD OF THE INVENTION

The present invention relates to CS1-specific antibody (clone 7A8D5) and anti-CS1-CAR-T cells, which are useful in the field of adoptive immunity gene therapy for tumors.

BACKGROUND OF THE INVENTION

Immunotherapy is emerging as a highly promising approach for the treatment of cancer. T cells or T lymphocytes, the armed forces of our immune system, constantly look for foreign antigens and discriminate abnormal (cancer or infected cells) from normal cells. Genetically modifying T cells with CAR (Chimeric antigen receptor) constructs is the most common approach to design tumor-specific T cells. CAR-T cells targeting tumor-associated antigens (TAA) can be infused into patients (called adoptive cell transfer or ACT) representing an efficient immunotherapy approach [1, 2]. The advantage of CAR-T technology compared with chemotherapy or antibody is that reprogrammed engineered T cells can proliferate and persist in the patient ("a living drug") [1, 2].

CARs usually consist of a monoclonal antibody-derived single-chain variable fragment (scFv) at the N-terminal part, hinge, transmembrane domain and a number of intracellular co-stimulatory domains: (i) CD28, (ii) CD137 (4-1BB), CD27 or other co-stimulatory domains, in tandem with a activation CD3-zeta domain. (FIG. 1) [2; 3]. The evolution of CARs went from first generation (with no co stimulatory domains) to second generation (with one co-stimulatory domain) to third generation CAR (with several co-stimulatory domains). Generating CARs with multiple costimulatory domains (the so-called $3^{rd}$ generation CAR) have led to increased cytolytic CAR-T cell activity, improved persistence of CAR-T cells leading to its augmented antitumor activity.

CS1 (SLAM family member 7, CD319) antigen is overexpressed in multiple myeloma cells. The amino acid sequence of CS1 protein is shown in FIG. 2 with the extracellular domain underlined.

BRIEF DESCRIPTION OF THE DRAWINGS

FIG. 1. The structures of CAR. The left panel shows the structure of first generation (no co-stimulatory domains). The middle panel shows the structure of the second generation (one co-stimulatory domain CD28 or 4-BB). The right panel shows the third generation of CAR (two or more co-stimulatory domains). [4].

FIG. 2. The amino acid sequence of CS1 protein (SEQ ID NO: 1)

FIG. 11A: Real-time Cytotoxicity Assay (RTCA) with CHO-CS1-positive cells. FIG. 11B: RTCA assay with CHO (CS1-negative) cells. CS1-CD28-CD3 CAR-T cells.

FIG. 12A: Real-time Cytotoxicity assay (RTCA) with Hela-CS1-positive cells. FIG. 12B: RTCA assay with Hela (CS1-negative) cells. PMC622, CS1-CD28-CD3 CAR-T cells.

DETAILED DESCRIPTION OF THE INVENTION

Definitions

As used herein, a "chimeric antigen receptor (CAR)" is a receptor protein that has been engineered to give T cells the new ability to target a specific protein. The receptor is chimeric because they combine both antigen-binding and T-cell activating functions into a single receptor. CAR is a fused protein comprising an extracellular domain capable of binding to an antigen, a transmembrane domain, and at least one intracellular domain. The "chimeric antigen receptor (CAR)" is sometimes called a "chimeric receptor", a "T-body", or a "chimeric immune receptor (CIR)." The "extracellular domain capable of binding to an antigen" means any oligopeptide or polypeptide that can bind to a certain antigen. The "intracellular domain" means any oligopeptide or polypeptide known to function as a domain that transmits a signal to cause activation or inhibition of a biological process in a cell.

As used herein, a "domain" means one region in a polypeptide which is folded into a particular structure independently of other regions.

As used herein, a "single chain variable fragment (scFv)" means a single chain polypeptide derived from an antibody which retains the ability to bind to an antigen. An example of the scFv includes an antibody polypeptide which is formed by a recombinant DNA technique and in which Fv regions of immunoglobulin heavy chain (H chain) and light chain (L chain) fragments are linked via a spacer sequence. Various methods for engineering an scFv are known to a person skilled in the art.

As used herein, a "tumor antigen" means a biological molecule having antigenicity, expression of which causes cancer.

The inventors have generated mouse anti-human monoclonal antibody specifically targeting CS1. The inventors have produced CS1-CAR-T cells to target cancer cells overexpressing CS1 tumor antigen. The CS1-CAR-T cells of the present invention have high cytotoxic activity against several cancer cell lines The present invention is directed to a mouse monoclonal anti-human CS1 antibody or an antigen-binding fragment thereof (e.g., Fab, (Fab)$_2$, scFv), comprising V$_H$ having the amino acid of SEQ ID NO: 4 and V$_L$ having the amino acid of SEQ ID NO: 5. The monoclonal anti-human CS1 antibody is generated against human CS1. In one embodiment, the monoclonal anti-human CS1 antibody fragment is a single-chain variable fragment (scFv). The ScFv can be VH-linker-VL or VL-linker-VH.

The present invention is also directed to a chimeric antigen receptor fusion protein comprising from N-terminus to C-terminus: (i) a single-chain variable fragment (scFv) against CS1 antigen (the present invention), (ii) a transmembrane domain, (iii) at least one co-stimulatory domains, and (iv) an activating domain.

Figure 3:
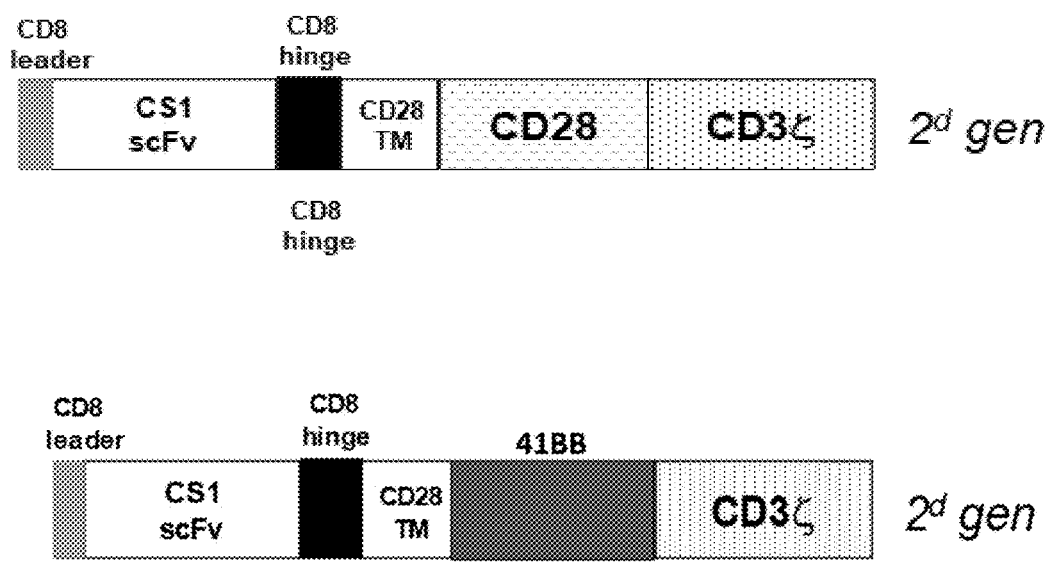
FIG. 3. The structures of CS1 CAR constructs. The second-generation CAR is used with either CD28 co-stimulatory domain or 41BB domain.

In some embodiments, the CS1 CAR structures are shown in FIG. 3.

In one embodiment, the co-stimulatory domain is selected from the group consisting of CD28, 4-1BB, GITR, ICOS-1, CD27, OX-40 and DAP10 domains. A preferred the co-stimulatory domain is CD28 or 4-1BB.

A preferred activating domain is CD3-zeta (CD3 Z or CD3ζ).

The transmembrane domain may be derived from a natural polypeptide, or may be artificially designed. The transmembrane domain derived from a natural polypeptide can be obtained from any membrane-binding or transmembrane protein. For example, a transmembrane domain of a T cell receptor α or β chain, a CD3 zeta chain, CD28, CD3ε, CD45, CD4, CD5, CD8, CD9, CD16, CD22, CD33, CD37, CD64, CD80, CD86, CD134, CD137, ICOS, CD154, or a GITR can be used. The artificially designed transmembrane domain is a polypeptide mainly comprising hydrophobic residues such as leucine and valine. It is preferable that a triplet of phenylalanine, tryptophan and valine is found at each end of the synthetic transmembrane domain. Optionally, a short oligopeptide linker or a polypeptide linker, for example, a linker having a length of 2 to 10 amino acids can be arranged between the transmembrane domain and the intracellular domain. In one embodiment, a linker sequence having a glycine-serine continuous sequence can be used.

The present invention provides a nucleic acid encoding the BCMA-CAR. The nucleic acid encoding the CAR can be prepared from an amino acid sequence of the specified CAR by a conventional method. A base sequence encoding an amino acid sequence can be obtained from the NCBI RefSeq IDs or accession numbers of GenBank for an amino acid sequence of each domain, and the nucleic acid of the present invention can be prepared using a standard molecular biological and/or chemical procedure. For example, based on the base sequence, a nucleic acid can be synthesized, and the nucleic acid of the present invention can be prepared by combining DNA fragments which are obtained from a cDNA library using a polymerase chain reaction (PCR).

A nucleic acid encoding the CAR of the present invention can be inserted into a vector, and the vector can be introduced into a cell. For example, a virus vector such as a retrovirus vector (including an oncoretrovirus vector, a lentivirus vector, and a pseudo type vector), an adenovirus vector, an adeno-associated virus (AAV) vector, a simian virus vector, a vaccinia virus vector or a Sendai virus vector, an Epstein-Barr virus (EBV) vector, and a HSV vector can be used. A virus vector lacking the replicating ability so as not to self-replicate in an infected cell is preferably used.

For example, when a retrovirus vector is used, a suitable packaging cell based on a LTR sequence and a packaging signal sequence possessed by the vector can be selected for preparing a retrovirus particle using the packaging cell. Examples of the packaging cell include PG13 (ATCC CRL-10686), PA317 (ATCC CRL-9078), GP+E-86 and GP+envAm-12, and Psi-Crip. A retrovirus particle can also be prepared using a 293 cell or a 293T cell having high transfection efficiency. Many kinds of retrovirus vectors produced based on retroviruses and packaging cells that can be used for packaging of the retrovirus vectors are widely commercially available from many companies.

A CAR-T cell binds to a specific antigen via the CAR, thereby a signal is transmitted into the cell, and as a result, the cell is activated. The activation of the cell expressing the CAR is varied depending on the kind of a host cell and an intracellular domain of the CAR, and can be confirmed based on, for example, release of a cytokine, improvement of a cell proliferation rate, change in a cell surface molecule, or the like as an index. For example, release of a cytotoxic cytokine (a tumor necrosis factor, lymphotoxin, etc.) from the activated cell causes destruction of a target cell expressing an antigen. In addition, release of a cytokine or change in a cell surface molecule stimulates other immune cells, for example, a B cell, a dendritic cell, a NK cell, and a macrophage.

The cell expressing the CAR can be used as a therapeutic agent for a disease. The therapeutic agent comprises the cell expressing the CAR as an active ingredient, and it may further comprise a suitable excipient.

The inventors have generated CS1-ScFv-CD28-CD3-CAR-T (CS1-CAR-T) cells against hematological cancer cells overexpressing CS1 (multiple myeloma). The inventors have provided data demonstrating efficient expression of CS1 in multiple myeloma. CS1-CAR-T cells express higher cytotoxic activity against CS1-positive target cancer cells than against non-transduced T cells and Mock-CAR-T cells.

The advantage of the CS1 monoclonal antibody or CS1-ScFv of the present invention over other known CS1 antibodies is that the present antibody is highly specific against CS1-positive cancer cells. The CS1 antibody is highly potent as a therapeutic agent in many clinical applications.

The present monoclonal mouse anti-human CS1 antibody detects CS1 in CS1-positive cancer cells.

The present CS1 antibody can be used for immunotherapy applications: toxin/drug-conjugated antibody, monoclonal therapeutic antibody, humanization of CS1 antibody, CAR-T cell immunotherapy.

CS1-CAR-T cells using the present CS1 antibody effectively target CS1 antigen in CS1-positive cell lines such as multiple myeloma.

CS1-CAR-T cells can be used in combination with different therapies: checkpoint inhibitors; targeted therapies, small molecule inhibitors, and antibodies.

CS1 antibody can be modified with site-directed mutagenesis for affinity tuning; it can be used for humanization and for complete human antibody generation.

CS1-CAR-T cells can be used clinically to target CS1-positive cells.

Modifications of co-activation domains: CD28, 4-1BB and others can be used to increase the CAR efficacy. Tag-conjugated CS1 ScFv can be used for CAR generation.

Third generation CAR-T or other co-activation signaling domains can be used with CS1-scFv inside CAR.

Combination of CS1 with other CAR targeting other tumor antigens or tumor microenvironment (VEGFR-1-3), PDL-1, CD80 or bi-scFv-CAR can be used to enhance activity of monotherapy CS1-CAR.

CS1-CARs can be used to generate other types of cells such as CAR-Natural Killer (NK) cells, CS1-CAR-macrophages, CS1-CAR-hematopoietic cells, and other cells.

Bi-specific antibodies with CS1 and BCMA (tumor necrosis factor receptor superfamily member 17), CD3, or other antigens can be generated for therapy.

CS1 and BCMA proteins are often overexpressed in multiple myeloma. Based on their high percent of expression in multiple myeloma, both targets are used for CAR-T cell therapy. One of the challenges is that BCMA can be down-regulated or lost, causing resistance to treatment of BCMA-CAR T cells. Bi-specific BCMA-CS1 CAR-T cells can be used for more effective therapy of multiple myeloma.

Figure 4:
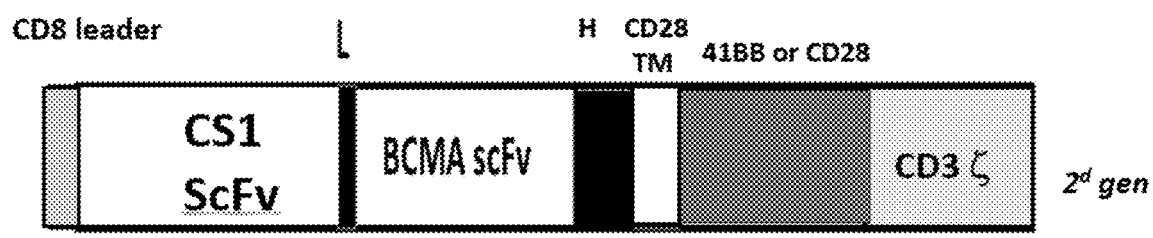
FIG. 4. The structure of bispecific BCMA-CS1 CAR construct.

In one embodiment, the construct of bispecific BCMA-CS1 CAR-T cells is shown in FIG. 4.

The following examples further illustrate the present invention. These examples are intended merely to be illustrative of the present invention and are not to be construed as being limiting.

EXAMPLES

The inventors generated CS1 CAR constructs inside lentiviral vector cloned into the lentiviral vector. The lentiviral CAR construct containing the CS1 ScFv-CD28-CD3zeta insert—or similar with 41BB domain instead of CD28 domain. The CARs were used either under EF1 or MNDU3 promoter.

The lentiviruses were generated in 293 T cells and the titers were established by RT-PCR. Then equal dose of lentiviruses was used for transduction of T cells, as described in Examples.

Materials and Methods

Example 1. Cell Lines

Raji, RPMI8226, MM1S, K562, CHO cell lines were purchased from the ATCC (Manassas, VA) and cultured either in DMEM (GE Healthcare, Chicago, IL) or in RPMI-1640 medium (Thermo Fisher, Waltham, MA) containing 10% FBS (AmCell, Mountain View, CA). CHO-CS1 cells were purchased from BPS Bioscience (San Diego, CA) and cultured in Ham's F12K medium containing 10% FBS and 1 mg/ml geneticin (Thermo Fisher). Hela-CS1 cells were generated from HeLa cells by transducing with CS1 cDNA lentivirus. Human peripheral blood mononuclear cells (PBMC) were isolated from whole blood obtained in the Stanford Hospital Blood Center, Stanford according to IRB-approved protocol (#13942). PBMC were isolated by density sedimentation over Ficoll-Paque (GE Healthcare) and cryopreserved for later use.

Example 2. Mouse Anti-Human CS1 Antibody

We generated mouse monoclonal anti-human CS1 antibody, clone 7A8D5 using hybridoma standard technology.

Six-eight weeks old BALB/c mice were immunized by subcutaneous injection. with the recombinant fusion CS1 protein extracellular domain (23-226 amino acids). For hybridoma generation the immunized mice splenocytes were fused with SP/0 myeloma cells using PEG (polyethylene glycol) and HAT (hypoxanthine-aminopterin-thymidine) medium selection. Hybridomas were diluted using 96-well plates to obtain single clones and screened by ELISA for selection of positive clones using the immunogen. The positive hybridoma clones were cultured and expanded to produce anti-CS1 antibodies. The supernatants of these antibody clones were collected, purified using Protein G column, and analyzed by Western blotting and FACS. The best positive clone 7A8D5 was selected and used for VH and VL sequencing for CAR generation.

Example 3. Lentiviral CAR Construct

The codon optimized sequence CS1 (7A8D5) ScFv was synthesized in IDT as a Gblock, and sub-cloned into second generation CAR sequence with either CD28 or 4-1BB costimulatory domains and CD3 activation domain. Mock CAR-T cells with extracellular TF tag-CD28-CD3 CAR-T cells were used as Mock CAR-T cells.

Example 4. Lentivirus Generation $2.5 \times 10^7$ HEK293FT cells (Thermo Fisher) were seeded on 0.01% gelatin-coated 15 cm plates and cultured overnight in DMEM, 2% FBS, 1×pen/strep. The cells were transfected with 10 μg of the CAR lentiviral vector and the pPACKH1 Lentivector Packaging mix (System Biosciences, Palo Alto, CA) using the NanoFect transfection NF100 agent (Alstem). The next day the medium was replaced with fresh medium, and after 48 hours the medium with lentiviral particles was collected. The medium was cleared of cell debris by centrifugation at 2100 g for 30 min. The virus particles were concentrated by ultracentrifugation at 112,000 g for 60 min at 4° C. using a SW28.1 rotor, resuspended in serum-free DMEM medium, and frozen in several aliquot vials at −80° C.

Example 5. CAR-T Cells

PBMC were suspended at $1 \times 10^6$ cells/ml in AIM V-AlbuMAX medium (Thermo Fisher) containing 10% FBS and 10 ng/ml IL-2 (Thermo Fisher) and activated by mixing with an equal number of CD3/CD28 Dynabeads (Thermo Fisher) in non-treated 24-well plates (0.5 ml per well). At 24 and 48 hours, lentivirus was added to the cultures at a multiplicity of infection (MOI) of 5-10. The T and CAR-T cells proliferated over 10-12 days with medium changed every 3 days to maintain the cell density at $1-2 \times 10^6$ cells/ml.

Example 6. Flow Cytometry (FACS)

First, 0.25 million cells were suspended in 100 µl of buffer (PBS containing 2 mM EDTA pH 8 and 0.5% BSA) and incubated on ice with 1 µl of human serum for 10 min. The diluted primary antibody was used with cells for 30 min at 4° C., and then after washing the biotin-conjugated goat anti-mouse F(ab)'$_2$ was added with CD3-allophycocyanin (APC)-conjugated mouse anti-human CD3 antibody and PE-conjugated streptavidin at 1:100 dilution and incubated for 30 min at 4° C. The cells were rinsed with 3 ml of washing buffer, then stained for 10 min with 7-AAD, suspended in the FACS buffer and analyzed on a FACS Calibur (BD Biosciences). Cells were gated first for light scatter versus 7-AAD staining, then the 7-AAD-live gated cells were plotted for anti-CD3 staining versus CAR+ staining with anti-(Fab)$_2$ antibodies.

Example 7. Real Time Cytotoxicity Assay (RTCA)

Adherent target cells (CHO-CS1; CHO; Hela-CS1 or Hela) ($1 \times 10^4$ cells per well) were seeded into 96-well E-plates (Acea Biosciences, San Diego, CA) using the impedance-based real-time cell analysis (RTCA) xCELLigence system (Acea Biosciences). The next day, the medium was removed and replaced with AIM V-AlbuMAX medium containing 10% FBS±$1 \times 10^5$ effector cells in triplicate (CAR-T cells or non-transduced T cells). The cells were monitored for another 24-48 hours with the RTCA system, and impedance was plotted over time. Cytolysis was calculated as (impedance of target cells without effector cells minus impedance of target cells with effector cells)×100/impedance of target cells without effector cells.

Example 8. IFN-Gamma Secretion Assay

Non-adherent target cells (Raji, MM1S, K562) were cultured with the effector cells (CAR-T cells or non-transduced T cells) at a 1:1 ratio ($1 \times 10^4$ cells each) in U-bottom 96-well plates with 200 µl of AIM V-AlbuMAX medium containing 10% FBS, in triplicate. After 16 hours, the top 150 µl of medium was transferred to V-bottom 96-well plates and centrifuged at 300 g for 5 min to pellet any residual cells. The top 120 µl of supernatant was transferred to a new 96-well plate and analyzed by ELISA for human IFN-γ levels using a kit from R&D Systems (Minneapolis, MN) according to the manufacturer's protocol. The supernatant after RTCA with adherent target cells was collected and analyzed as above.

Example 9. NSG Mouse Tumor Xenograft Model and Imaging

Six-weeks old male NSG mice (Jackson Laboratories, Bar Harbor, ME) were housed in accordance with the Institutional Animal Care and Use Committee (IACUC). Each mouse was injected subcutaneously on day 0 with 100 µl of $1.5 \times 10^6$ MM1S-luciferase positive cells in sterile serum free medium. Next day $1 \times 10^7$ CAR-T cells in serum-free medium were injected intravenously. Imaging was done after luciferin injection using Xenogen Ivis System. Quantification was done by measuring bioluminescence (BLI) in photons/sec signals. Kaplan-Myer survival curve was plotted with GraphPad Prism software based on mice survival data.

Example 10. Statistical Analysis

Data were analyzed with Prism software (GraphPad, San Diego, CA). Comparisons between two groups were performed by unpaired Student's t-test; comparisons between multiple groups were done with one or two-way ANOVA followed by Sidak or Dunnett's tests. The p-value <0.05 was considered significant.

Sequences

Example 11. Mouse CS1 scFv Sequences

The sequence of VH and VL and ScFv. CS1 scFv was obtained by sequencing one of the hybridoma clones 7A8D5 positive for CS1. The structure of CS1 scFv is: VH-linker-VL.

The nucleotide sequence of mouse CS1 scFv Sequences (clones 7A8D5) is shown below. The bold highlights the nucleotide sequence of $V_H$; the underlined highlights the nucleotide sequence of $V_L$; in between (shown in italics font) is the nucleotide sequence encoding the linker.

```
                                              (SEQ ID NO: 2)
GTC CAA CTT CAG CAG TCC GGG CCG GAA GTC GTA

CGA CCG GGA GTC AGC GTC AAG ATA AGC TGT AAA

GGCTCT GGC TAT ACT TTC ACC GAC TAT GCT ATA

CAC TGG GTC AAG CAA TCT CAT GCC AAA TCA CTG

GAG TGGATT GGG GTC ATT AAT ACG TAC AAC GGG

AAC ACT AAC TAC AAT CAA AAA TTT AAG GGT AAG

GCC ACT ATGACG GTA GAT AAA AGT AGT TCA ACG

GCC TAC ATG GAG CTT GCG CGG TTG ACT AGT GAA

GAT AGT GCG ATATAT TAC TGC ACT AGA ACA GGC

TAT TAT TAT GGC CCT TCT CAC TAC TTC GAC TAT

TGG GGG CAG GGT ACGACG TTG ACC GTT AGC TCT

GGA GGT GGG GGC TCC GGT GGA GGT GGA TCA GGG

GGT GGA GGG AGC GAT ATTGTG CTC ACA CAA TCA

CCG GCA TCC TTG ACT GTT TCC CTT GGT CAA AGA

GCT ACA ATG TCA TGC AGG GCCAGT AAA TCA GTC

TCT ACTTCA GGA TAT AGC TAC GTG CAC TGG TAT

CAA CAA AAA CCG GGG CAG CCA CCTAAG TTG CTG

ATA TAT CTG GCC AGC AAC TTG GAG TCT GGT GTG

CCA GCC CGC TTT TCC GCG TCC GGT TCAGGA ACA

GAC TTT ACC CTT AAC ATA CAT CCC GTC GAG GAA

GAG GAT GCA GCT ACT TAT TAT TGC CAG CACAGC

CGG GAG TTG CCC TGG ACC TTT GGT GGG GGT ACG

AAA TTG GAG ATA AAG CGG
```

CS1 scFv Protein, amino acid sequence
(SEQ ID NO: 3)
VQLQQSGPEVVRPGVSVKISCKGSGYTFTDYAIHWVKQSHA

KSLEWIGVINTYNGNTNYNQKFKGKATMTVDKSSSTAYMEL

ARLTSEDSAIYYCTRTGYYYGPSHYFDYWGQGTTLTVSSGG

GGSGGGGSGGGGSDIVLTQSPASLTVSLGQRATMSCRASKS

VSTSGYSYVHWYQQKPGQPPKLLIYLASNLESGVPARFSAS

GSGTDFTLNIHPVEEEDAATYYCQHSRELPWTFGGGTKLEI

KR.

In the protein, the bold highlights the amino acid sequence of $V_H$; the underlined highlights the amino sequence of $V_L$; in between (italicized) is the amino acid sequence of 3×G4S linker sequence.

CS1 VH, amino acid sequence (SEQ ID NO: 4):
VQLQQSGPEVVRPGVSVKISCKGSGYTFTDYAIHWVKQSHAK

SLEWIGVINTYNGNTNYNQKFKGKATMTVDKSSSTAYMELAR

LTSEDSAIYYCTRTGYYYGPSHYFDYWGQGTTLTVSS

CS1 VL, amino acid sequence (SEQ ID NO: 5)
DIVLTQSPASLTVSLGQRATMSCRASKSVSTSGYSYVHWYQQ

KPGQPPKLLIYLASNLESGVPARFSASGSGTDFTLNIHPVEE

EDAATYYCQHSRELPWTFGGGTKLEIKR

The linker amino sequence is 3xG4S
(SEQ ID NO: 6)
GGGGSGGGGSGGGGS

Example 12. CS1-CAR Sequence (PMC418)

The scheme of CS1-CAR constructs is shown on FIG. 3. Lentiviral vector with MNDU3 promoter was used for cloning of all scFv CAR sequences.

The following nucleotide sequence shows CS1 ScFv-CD8 hinge-TM28-CD28-CD3 zeta of the present invention. The structure includes Human CD8 signaling peptide, CS1 scFv ($V_H$-Linker 3×(G4S)-$V_L$), CD8 hinge, CD28 transmembrane, activation domains, CD3 zeta. Similar CAR construct was also used with 4-1BB domain instead of CD28 domain (FIG. 3).

CS1 scFv ($V_H$-Linker-VL)-CD8 Hinge CD28 TM-CD28-CD3-Zeta:

<CD8 leader>
Nucleotide sequence,
SEQ ID NO: 7
ATGGCCTTACCAGTGACCGCCTTGCTCCTGCC

GCTGGCCTTGCTGCTCCACGCCGCCAGGCCG

Amino acid sequence,
SEQ ID NO: 8
MALPVTALLLPLALLLHAARP

<Nhe I site>
Nucleotide sequence
gctagc

Amino Acid Sequence
AS

<CS1 scFV>
See Example 11.
<XhoI restriction site>
Nucleotide sequence
CTCGAG

Amino acid sequence
LE

<CD8 hinge>
Nucleotide sequence,
SEQ ID NO: 9
AAGCCCACCACGACGCCAGCGCCGCGACCACCAACAC

CGGCGCCCACCATCGCGTCGCAGCCCCTGTCCCTGCG

CCCAGAGGCGAGCCGGCCAGCGGCGGGGGGCGCA

GTGCACACGAGGGGGCTGGACTTCGCCAGTGAT

Amino acid sequence,
SEQ ID NO: 10
KPTTTPAPRPPTPAPTIASQPLSLRPEASRPAA

GGAVHTRGLDFASD

<Spacer>
Nucleotide sequence
aagccc

Amino Acid sequence
KP

<CD28 TM>
Nucleotide sequence,
SEQ ID NO: 11
Ttttgggtgctggtggtggttggtggagtcctggcttgcta tagcttgctagtaacagtggcctttattattttctgggtg Amino Acid sequence,
SEQ ID NO: 12
FWVLVVVGGVLACYSLLVTVAFIIFWV <CD28 activation>
Nucleotide sequence,
SEQ ID NO: 13
aggagtaagaggagcaggctcctgcacagtgactacatgaac atgactccccgccgcccgggcccacccgcaagcattaccagc cctatgccccaccacgcgacttcgcagcctatcgctcc Amino acid sequence,
SEQ ID NO: 14
RSKRSRLLHSDYMNMTPRRPGPTRKHYQPYAPPRDFAAYRS <CD3 zeta>
Nucleotide sequence,
SEQ ID NO: 15
AGAGTGAAGTTCAGCAGGAGCGCAGACGCCCCCGCGTACCAG

CAGGGCCAGAACCAGCTCTATAACGAGCTCAATCTAGGACGA

AGAGAGGAGTACGATGTTTTGGACAAGAGACGTGGCCGGGAC

CCTGAGATGGGGGGAAAGCCGCAGAGAAGGAAGAACCCTCAG

GAAGGCCTGTACAATGAACTGCAGAAAGATAAGATGGCGGAG

```
GCCTACAGTGAGATTGGGATGAAAGGCGAGCGCCGGAGGGGC

AAGGGGCACGATGGCCTTTACCAGGGTCTCAGTACAGCCACC

AAGGACACCTACGACGCCCTTCACATGCAGGCCCTGCCCCCT

CGCTAA

Amino-acid sequence,
                                        SEQ ID NO: 16
RVKFSRSADAPAYQQGQNQLYNELNLGRREEYDVLDKRRGRD

PEMGGKPQRRKNPQEGLYNELQKDKMAEAYSEIGMKGERRRG

KGHDGLYQGLSTATKDTYDALHMQALPPR
```

The nucleotide sequence of full length CS1-CAR is shown below (CS1 scFV is between the underlined Nhe I and Xho I sites).

```
                                        (SEQ ID NO: 17)
ATGGCCTTACCAGTGACCGCCTTGCTCCTGCCGCTGGCCTTG

CTGCTCCACGCCGCCAGGCCGgctagc

GTC CAA CTT CAG CAG TCC GGG CCG GAA GTC GTA

CGA CCG GGA GTC AGC GTC AAG ATA AGC TGT AAA

GGCTCT GGC TAT ACT TTC ACC GAC TAT GCT ATA

CAC TGG GTC AAG CAA TCT CAT GCC AAA TCA CTG

GAG TGGATT GGG GTC ATT AAT ACG TAC AAC GGG

AAC ACT AAC TAC AAT CAA AAA TTT AAG GGT AAG

GCC ACT ATGACG GTA GAT AAA AGT AGT TCA ACG

GCC TAC ATG GAG CTT GCG CGG TTG ACT AGT GAA

GAT AGT GCG ATATAT TAC TGC ACT AGA ACA GGC

TAT TAT TAT GGC CCT TCT CAC TAC TTC GAC TAT

TGG GGG CAG GGT ACGACG TTG ACC GTT AGC TCT

GGA GGT GGG GGC TCC GGT GGA GGT GGA TCA GGG

GGT GGA GGG AGC GAT ATTGTG CTC ACA CAA TCA

CCG GCA TCC TTG ACT GTT TCC CTT GGT CAA AGA

GCT ACA ATG TCA TGC AGG GCCAGT AAA TCA GTC

TCT ACT TCA GGA TAT AGC TAC GTG CAC TGG TAT

CAA CAA AAA CCG GGG CAG CCA CCTAAG TTG CTG

ATA TAT CTG GCC AGC AAC TTG GAG TCT GGT GTG

CCA GCC CGC TTT TCC GCG TCC GGT TCAGGA ACA

GAC TTT ACC CTT AAC ATA CAT CCC GTC GAG GAA

GAG GAT GCA GCT ACT TAT TAT TGC CAG CACAGC

CGG GAG TTG CCC TGG ACC TTT GGT GGG GGT ACG

AAA TTG GAG ATA AAG CGGctcgagAAGCC

CACCACGACGCCAGCGCCGCGACCACCAACACCGGCGCCCAC

CATCGCGTCGCAGCCCCTGTCCCTGCGCCCAGAGGCGAGCCG

GCCAGCGGCGGGGGGCGCAGTGCACACGAGGGGCTGGACTT

CGCCAGTGATaagcccttttgggtgctggtggtggttggtgg agtcctggcttcatagcttgctagtaacagtggcctttatta ttttctgggtgaggagtaagaggagcaggctcctgcacagtg actacatgaacatgactccccgccgccccgggcccacccgca agcattaccagcccatgccccaccacgcgacttcgcagcct atcgctccAGAGTGAAGTTCAGCAGGAGCGCAGACGCCCCCG

CGTACCAGCAGGGCCAGAACCAGCTCTATAACGAGCTCAATC

TAGGACGAAGAGAGGAGTACGATGTTTTGGACAAGAGACGTG

GCCGGGACCCTGAGATGGGGGGAAAGCCGCAGAGAAGGAAGA

ACCCTCAGGAAGGCCTGTACAATGAACTGCAGAAAGATAAGA

TGGCGGAGGCCTACAGTGAGATTGGGATGAAAGGCGAGCGCC

GGAGGGGCAAGGGGCACGATGGCCTTTACCAGGGTCTCAGTA

CAGCCACCAAGGACACCTACGACGCCCTTCACATGCAGGCCC

TGCCCCCTCGCTAA
```

Translated amino acid sequence of CS1-CD28-CAR protein is shown below. VH is bold, VL is underlined.

```
                                        (SEQ ID NO: 18)
MALPVTALLLPLALLLHAARPASVQLQQSGPEVVRPGVSV

KISCKGSGYTFTDYAIHWVKQSHAKSLEWIGVINTYNGNT

NYNQKFKGKATMTVDKSSSTAYMELARLTSEDSAIYYCTR

TGYYYGPSHYFDYWGQGTTLTVSSGGGGSGGGGSGGGGSD

IVLTQSPASLTVSLGQRATMSCRASKSVSTSGYSYVHWYQ

QKPGQPPKLLIYLASNLESGVPARFSASGSGTDFTLNIHP

VEEEDAATYYCQHSRELPWTFGGGTKLEIKRLEKPTTTPA

PRPPTPAPTIASQPLSLRPEASRPAAGGAVHTRGLDFASD

KPFWVLVVVGGVLACYSLLVTVAFIIFWVRSKRSRLLHSD

YMNMTPRRPGPTRKHYQPYAPPRDFAAYRSRVKFSRSADA

PAYQQGQNQLYNELNLGRREEYDVLDKRRGRDPEMGGKPQ

RRKNPQEGLYNELQKDKMAEAYSEIGMKGERRRGKGHDGL

YQGLSTATKDTYDALHMQALPPR
```

Example 13. CS1-CAR Sequence with 41BB, (PMC717)

Similar to Example 12, CAR (PMC717) was prepared with 41BB instead of CD28 co-stimulating domain under MNDU3 promoter:

```
Nucleotide sequence of CS1 CAR (PMC717),
                                        SEQ ID NO: 19
ATGGCCTTACCAGTGACCGCCTTGCTCCTGCCGCTGG CCTTGCTGCTCCACGCCGCCAGGCCGgctagc

GTC CAA CTT CAG CAG TCC GGG CCG

GAA GTC GTA CGA CCG GGA GTC AGC

GTC AAG ATA AGC TGT AAA GGCTCT
```

```
GGC TAT ACT TTC ACC GAC TAT GCT

ATA CAC TGG GTC AAG CAA TCT CAT

GCC AAA TCA CTG GAG TGGATT GGG

GTC ATT AAT ACG TAC AAC GGG AAC

ACT AAC TAC AAT CAA AAA TTT AAG

GGT AAG GCC ACT ATGACG GTA GAT

AAA AGT AGT TCA ACG GCC TAC ATG

GAG CTT GCG CGG TTG ACT AGT GAA

GAT AGT GCG ATATAT TAC TGC ACT

AGA ACA GGC TAT TAT TAT GGC CCT

TCT CAC TAC TTC GAC TAT TGG GGG

CAG GGT ACGACG TTG ACC GTT AGC

TCT GGA GGT GGG GGC TCC GGT GGA

GGT GGA TCA GGG GGT GGA GGG AGC

GAT ATTGTG CTC ACA CAA TCA CCG

GCA TCC TTG ACT GTT TCC CTT GGT

CAA AGA GCT ACA ATG TCA TGC AGG

GCCAGT AAA TCA GTC TCT ACT TCA

GGA TAT AGC TAC GTG CAC TGG TAT

CAA CAA AAA CCG GGG CAG CCA CCT

AAG TTG CTG ATA TAT CTG GCC AGC

AAC TTG GAG TCT GGT GTG CCA GCC

CGC TTT TCC GCG TCC GGT TCAGGA

ACA GAC TTT ACC CTT AAC ATA CAT

CCC GTC GAG GAA GAG GAT GCA GCT

ACT TAT TAT TGC CAG CACAGC CGG

GAG TTG CCC TGG ACC TTT GGT GGG

GGT ACG AAA TTG GAG ATA

AAGCGGctcgagAAGCCCACCACGACGCCAGCGCCGCGACCA

CCAACACCGGCGCCCACCATCGCGTCGCAGCCCCTGTCCCTG

CGCCCAGAGGCGAGCCGGCCAGCGGCGGGGGCGCAGTGCAC

ACGAGGGGGCTGGACTTCGCCAGTGATaagcccttttgggtg ctggtggtggttggtggagtcctggcttgctatagcttgcta gtaacagtggcctttattattttctgggtgAAACGGGGCAGA

AAGAAACTCCTGTATATATTCAAACAACCATTTATGAGACCA

GTACAAACTACTCAAGAGGAAGATGGCTGTAGCTGCCGATTT

CCAGAAGAAGAAGGAGGATGTGAACTGAGAGTGAAGTTC

AGCAGGAGCGCAGACGCCCCCGCGTACCAGCAGGGCCAGAAC

CAGCTCTATAACGAGCTCAATCTAGGACGAAGAGAGGAGTAC

GATGTTTTGGACAAGAGACGTGGCCGGGACCCTGAGATGGGG

GGAAAGCCGCAGAGAAGGAAGAACCCTCAGGAAGGCCTGTAC

AATGAACTGCAGAAAGATAAGATGGCGGAGGCCTACAGTGAG

ATTGGGATGAAAGGCGAGCGCCGGAGGGGCAAGGGGCACGAT

GGCCTTTACCAGGGTCTCAGTACAGCCACCAAGGACACCTAC

GACGCCCTTCACATGCAGGCCCTGCCCCCTCGCTAA

Amino acid sequence of CS1 CAR (PMC717),
scFv is bold; 41BB is bold and underlined.
                                (SEQ ID NO: 20)
MALPVTALLLPLALLLHAARPASVQLQQSGPEVVRPGVSVKI

SCKGSGYTFTDYAIHWVKQSHAKSLEWIGVINTYNGNTNYNQ

KFKGKATMTVDKSSSTAYMELARLTSEDSAIYYCTRTGYYYG

PSHYFDYWGQGTTLTVSSGGGGSGGGGSGGGGSDIVLTQSPA

SLTVSLGQRATMSCRASKSVSTSGYSYVHWYQQKPGQPPKLL

IYLASNLESGVPARFSASGSGTDFTLNIHPVEEEDAATYYCQ

HSRELPWTFGGGTKLEIKRLEKPTTTPAPRPPTPAPTIASQP

LSLRPEASRPAAGGAVHTRGLDFASDKPFWVLVVVGGVLACY

SLLVTVAFIIFWVKRGRKKLLYIFKQPFMRPVQTTQEEDGCS

CRFPEEEEGGCELRVKFSRSADAPAYQQGQNQLYNELNLGRR

EEYDVLDKRRGRDPEMGGKPQRRKNPQEGLYNELQKDKMAEA

YSEIGMKGERRRGKGHDGLYQGLSTATKDTYDALHMQALPPR
```

Results

Example 14. CS1 Antibody Detects CS1 Protein by FACS in Multiple Myeloma Cells and in Stable CHO-CS1 Cells We developed hybridoma clones against extracellular domain of CS1 and selected best clone that specifically bound to CS1 antigen. Western blotting demonstrated binding of selected CS1 clone 7A8D5 to purified CS1 extracellular domain having molecular weight of 55 kDa.

Figure 5:
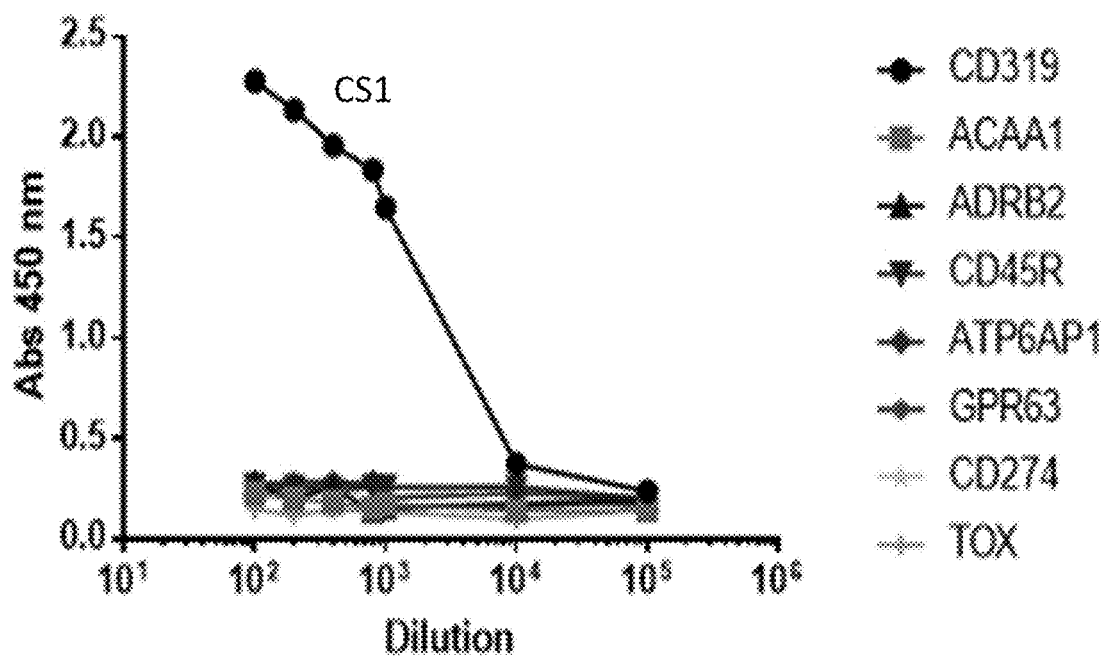
FIG. 5. ELISA shows binding to CS1 antigen but not with other negative control proteins by anti-CS1 antibody clone 7A8D5.
Figure 6:
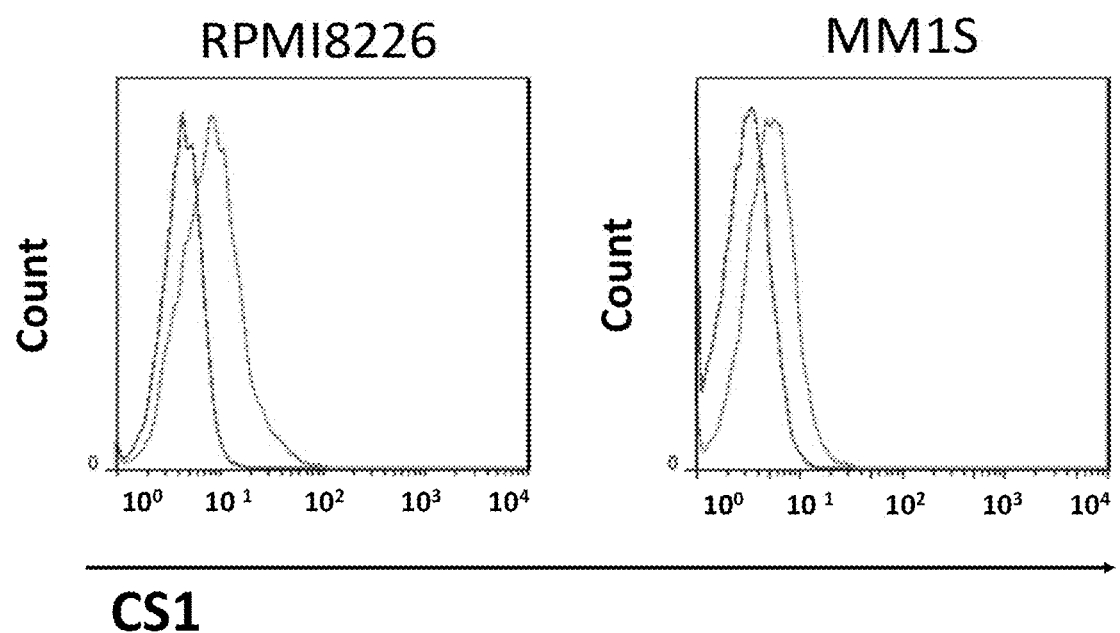
FIG. 6. Detection of CS1 by FACS in multiple myeloma cell lines: RPMI8226 and MM1S.

ELISA shows strong and specific binding of CS1 antibody (clone 7A8D5) to CS1 extracellular domain protein but not to negative control proteins (FIG. 5). FACS staining detected binding of CS1 antibody to extracellular CS1 protein in multiple myeloma cell lines RPMI8226 and MM1S (FIG. 6).

Figure 7:
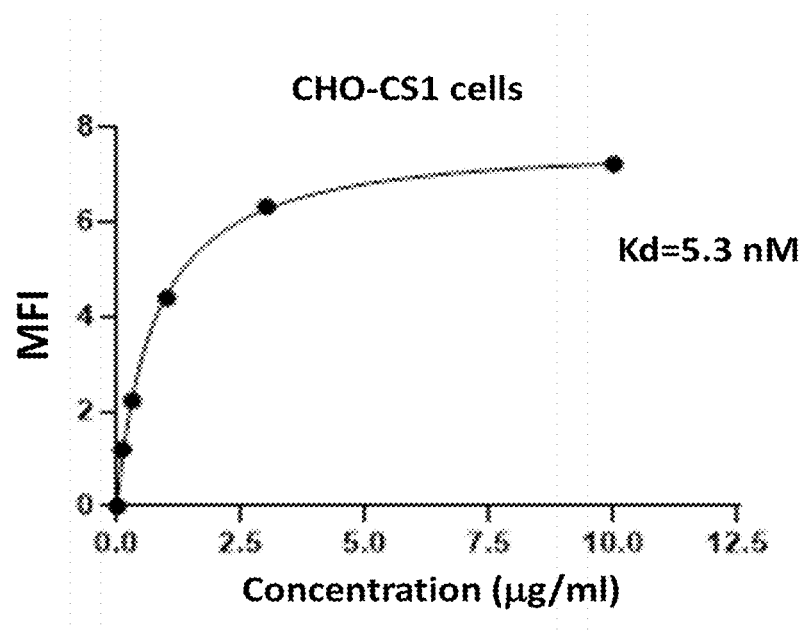
FIG. 7. Binding titration of CS1 antibody using CHO-CS1 cells. The representative curve is shown. The Kd of binding was equal to 0.8 ug/ml or 5.3 nM.

We performed binding titration of CS1 antibody (clone 7A8D5) on CHO-CS1 cells (FIG. 7). The Kd of CS1 antibody binding was 5.3 nM.

Immunohistochemical staining (IHC) showed that CS1 antibody did not stain normal and tumor samples with the exception of lymph gland tissues and liver (data now shown). Thus, CS1 antibody (clone 7A8D5) binds to CS1 with good affinity and specificity.

Example 15. The CS1-CD28-CD3 CAR-T Cells Expressed CS1 ScFv

Figure 8:
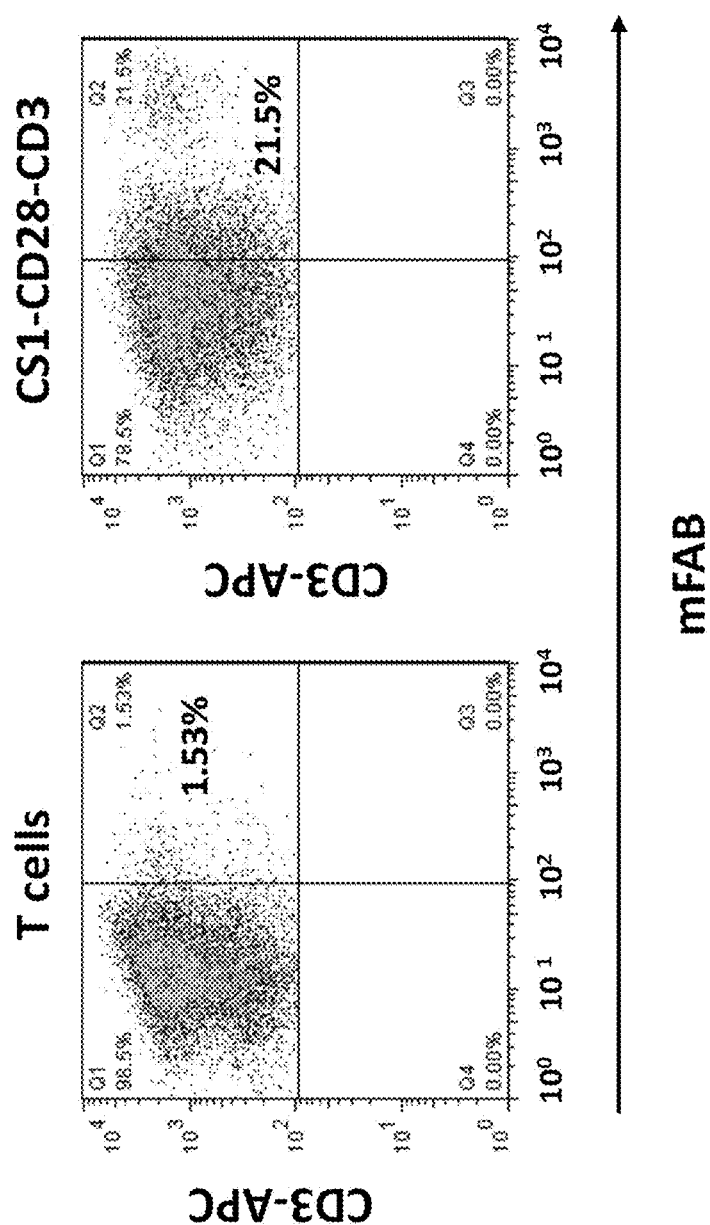
FIG. 8. Detection of CAR-positive T cells by FACS with mouse FAB antibody. CS1-CD28-CD3 CAR (PMC418) was used for analysis.

The CS1 scFv (clone 7A8D5) sequence was inserted with CD28 costimulatory and CD3 zeta activation domains inside CAR under EF-1 promoter lentiviral vector; and CAR lentiviruses were transduced into T cells. The CS1-CAR cells were effectively expanded in vitro. Mock control with scFv from intracellular protein were generated and used as a negative control in cytotoxicity and cytokine assay. The CS1-CAR+ cells were detected by FACS with mouse FAB antibody (21% of CAR-positive cells were detected with mouse FAB antibody) (FIG. 8).

Figure 9:
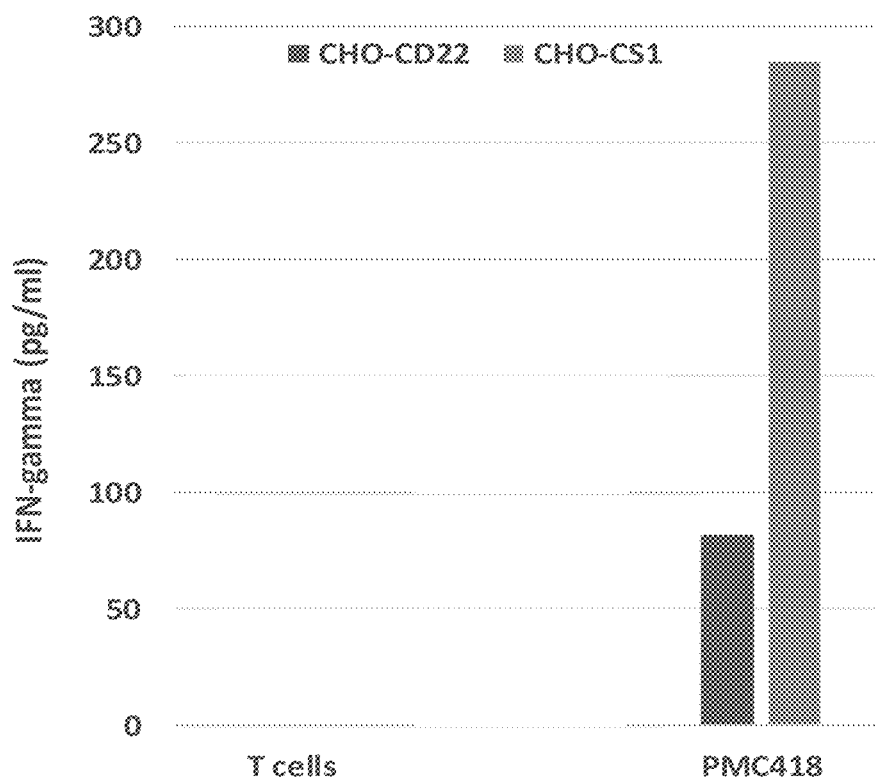
FIG. 9. CS1-CAR-T cells (PMC418) secreted high level of IFN-gamma against CHO-CS1 cells and not CHO-CD22 cells.

Example 16. CS1-CAR-T Cells Secreted High Level of IFN-Gamma Against CHO-CS1 Cells CS1-CAR-T cells (PMC418) were co-incubated with CHO-CS1 stable cell lines and CHO-CD22 cells (CS1-negative) and IFN-gamma ELISA assay was performed (FIG. 9).

Figure 10:
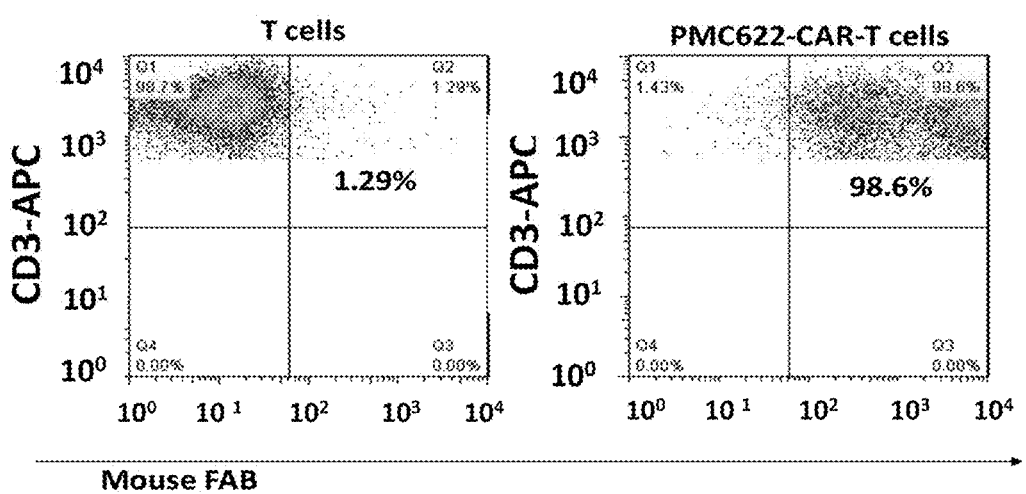
FIG. 10. Detection of CAR-positive cells by FACS. FACS was done with anti-mouse F(ab)2 antibody (mFAB), which detected ScFv-CAR+ positive cells. PMC622-CAR-T cells were shown.

Example 17. CS1 Clone 7A8D5-CD28-CD3 CAR-T Cells Under MNDU3 Promoter (PMC622) have Higher Expression of CAR+ Cells MNDU3 promoter has been shown in literature to result in higher expression of CAR-positive cells than EF1 promoter. We re-cloned PMC418-CAR into MNDU3-promoter lentiviral vector and checked expression of CAR and activity of CAR-T cells (PMC622). Transduction of CS1-CAR-T cells (PMC622) resulted in >97%-CAR-positive T cells as detected by FACS with anti-mouse FAB antibody (FIG. 10).

Figure 11A:
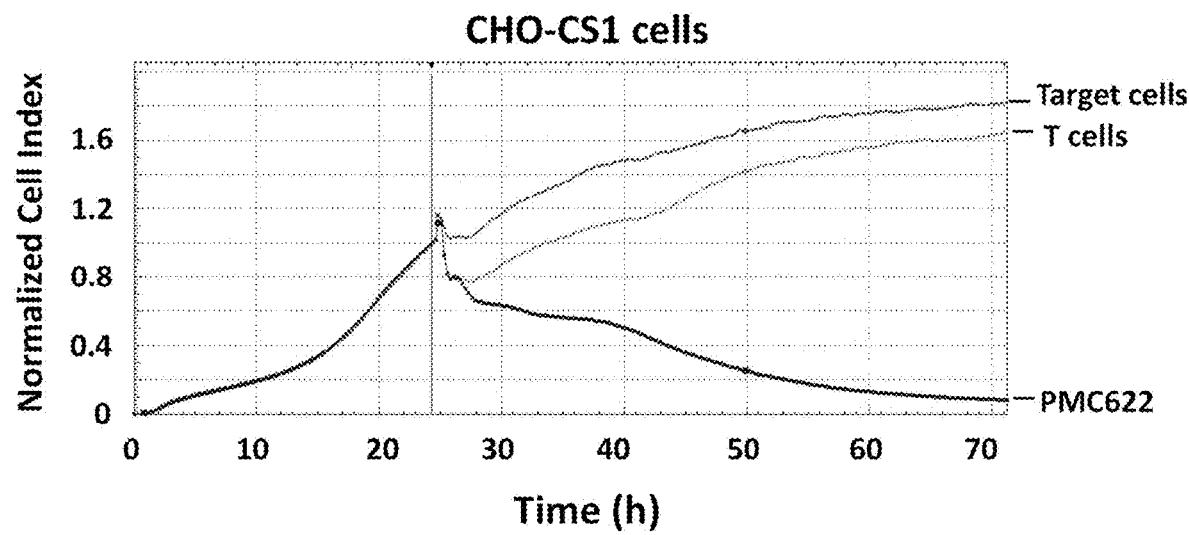
FIGS. 11A and 11B. CS1-CAR-T cells kill CHO-CS1 cells but not CHO cells.
Figure 11B:
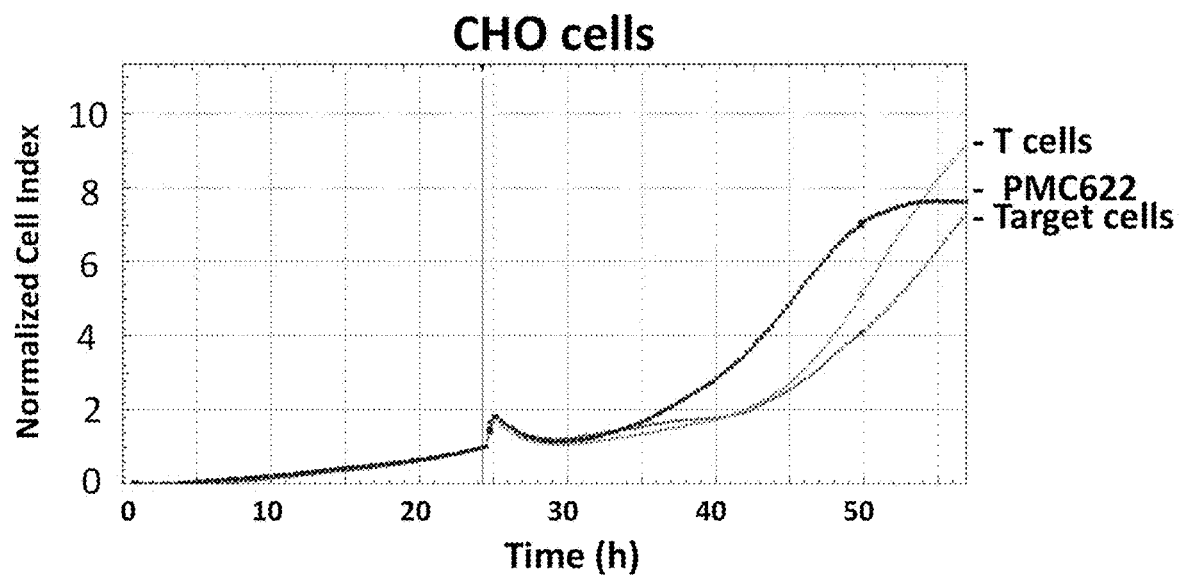
Figure 12A:
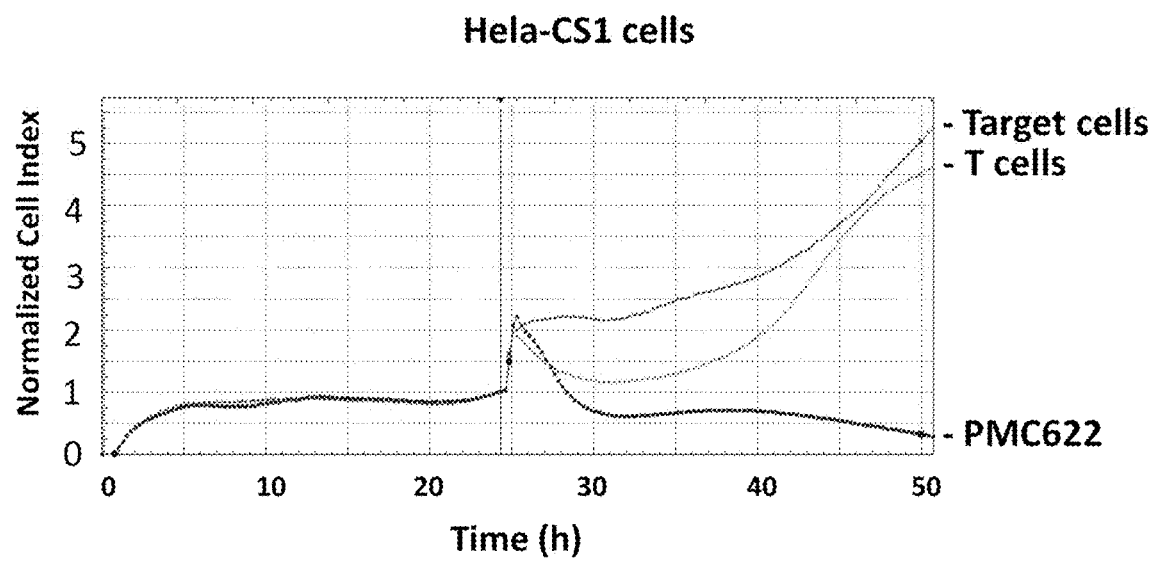
FIGS. 12A and 12B. CS1-CD28-CD3 CAR-T cells kill Hela-CS1 cells but not Hela cells.
Figure 12B:
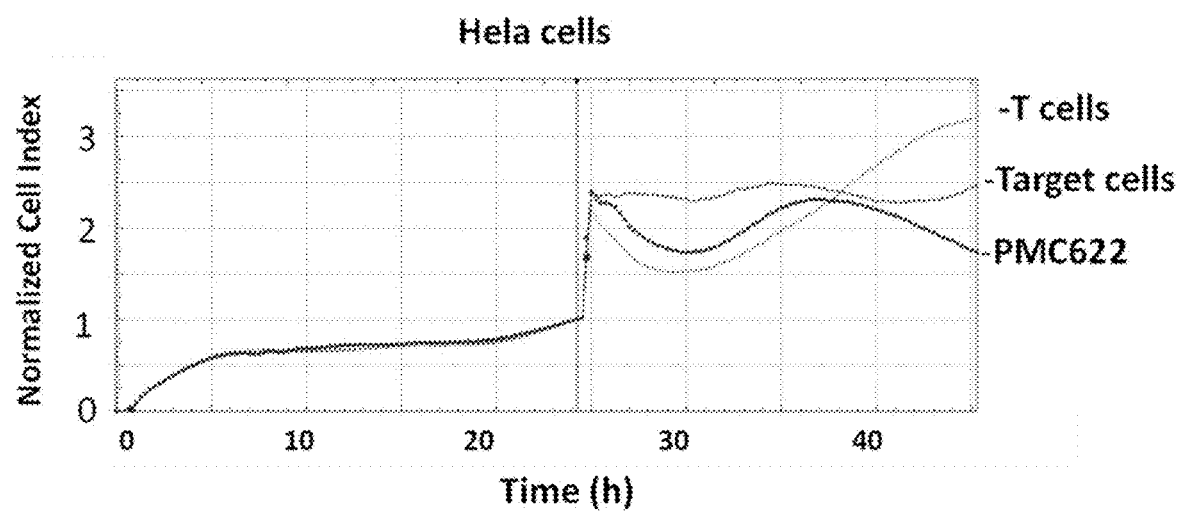

Example 18. Cytotoxic Activity of PMC622 CAR-T Cells Against CS1-Positive Target Cells PMC622 CS1-CD28-CD3 CAR-T cells specifically killed CHO-CS1 cells (FIG. 11A) but not negative control CHO cells (FIG. 11B). The same high killing activity of CS1-CAR-T cells was observed with Hela-CS1 cells (FIG. 12A) but not with negative control Hela cells (FIG. 12 B).

Example 19. Secretion of IFN-Gamma by CS1-CD28-CD3-CAR-T (PMC622) Cells

Figure 13A:
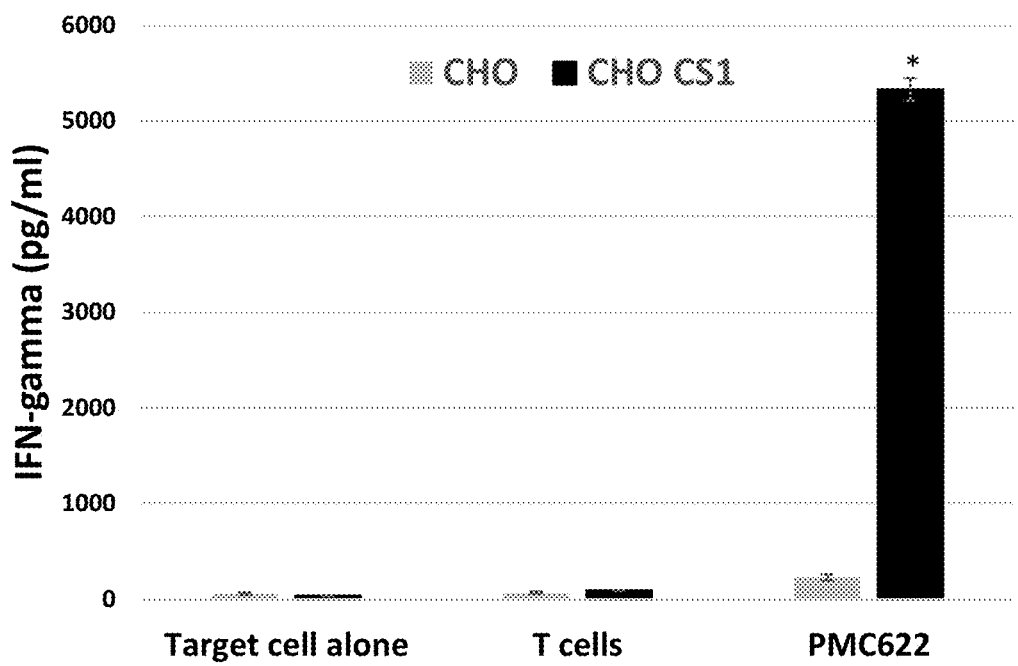
FIGS. 13A and 13B. Secretion of IFN-gamma by PMC622-CAR-T cells against CHO-CS1 cells, but not CHO cells (FIG. 13A), and against Hela-CS1 but not Hela cells (FIG. 13B). *p<0.05-, Student's t-test.
Figure 13B:
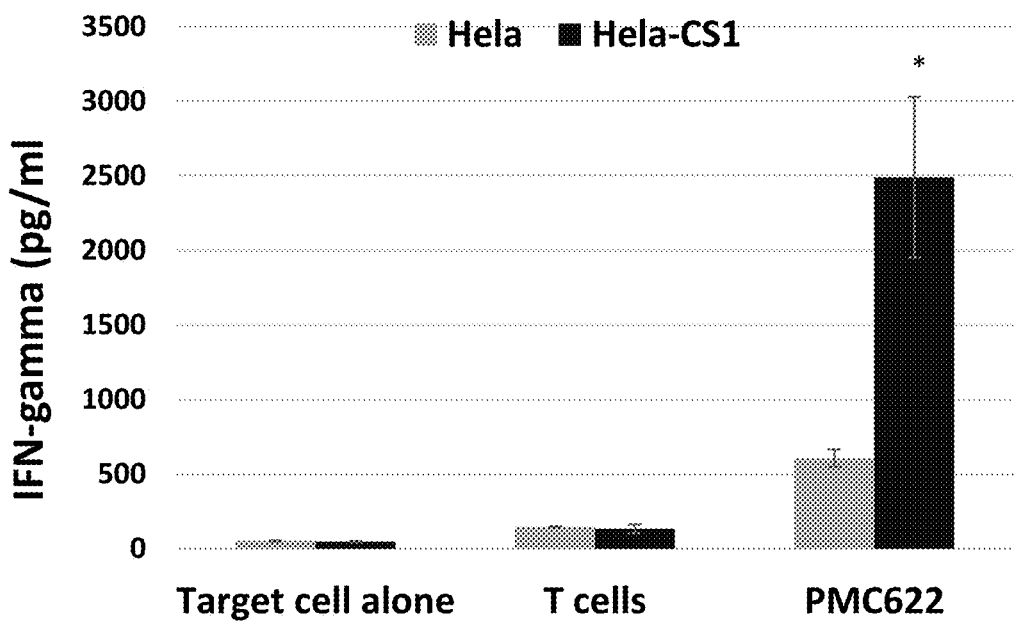

PMC622 CS1-CAR-T cells secreted high level of IFN-gamma against target CHO-CS1 cells but not against CHO cells (FIG. 13A). The same high and specific secretion of IFN-gamma was observed against Hela-CS1 cells (FIG. 13B).

Example 20. CS1-41BB-CD3 CAR-T Cells (PMC717) Killed CS1-Positive Target Cells

Figure 14:
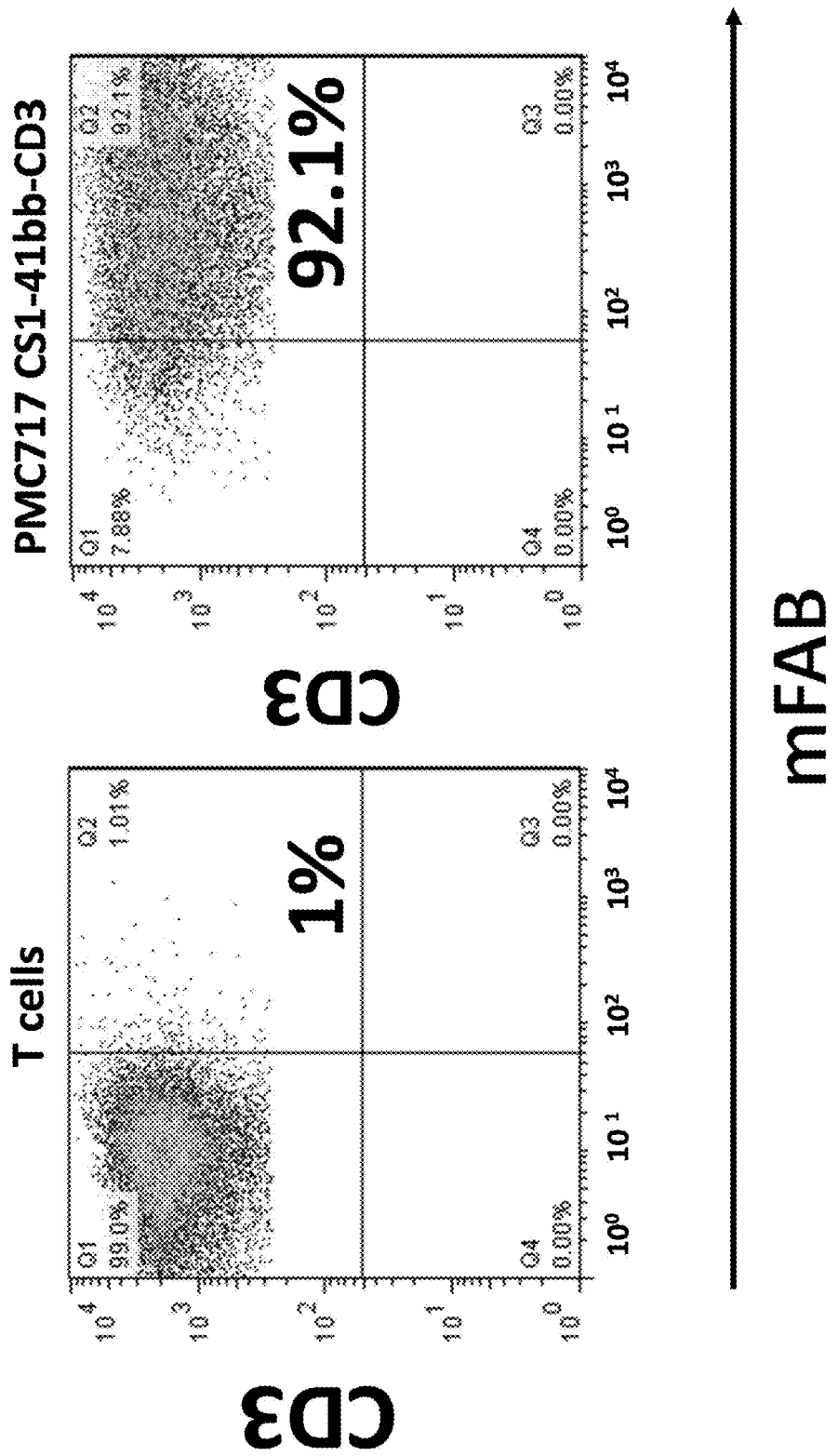
FIG. 14. Detection of CAR-positive cells by FACS. FACS was done with anti-mouse F(ab)2 antibody (mFAB), which detected ScFv-CAR+ positive cells. CS1-41BB-CD3-CAR-T (PMC717) cells are shown.

We also cloned CS1-41BB-CD3 CAR with 41BB costimulatory domain with CAR under MNDU3 promoter (PMC717) shown on FIG. 3. We transduced T cells and showed high percentage of CS1-41BB-CD3 CAR-positive cells (>90%) by FACS (FIG. 14).

Figure 15:
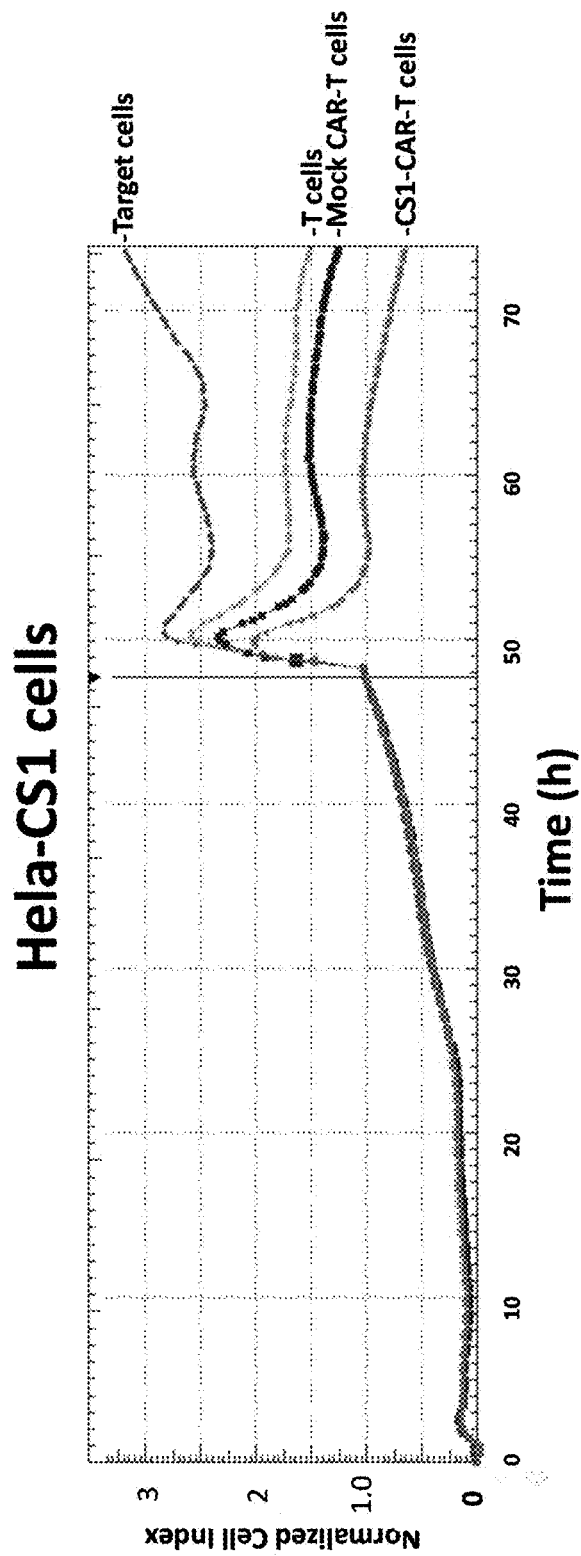
FIG. 15. CS1-41BB-CD3 CAR-T cells (PMC717) killed Hela-CS1 cells. Real-time cytotoxicity assay (RTCA) with Hela-CS1-positive cells.

We performed cytotoxicity assay with CS1-positive Hela-CS1 target cells (FIG. 15).

CS1-41BB-CD3 killed CS1-positive cells (FIG. 15), but did not kill Hela-BCMA (CS1-negative cells) (not shown).

Figure 16:
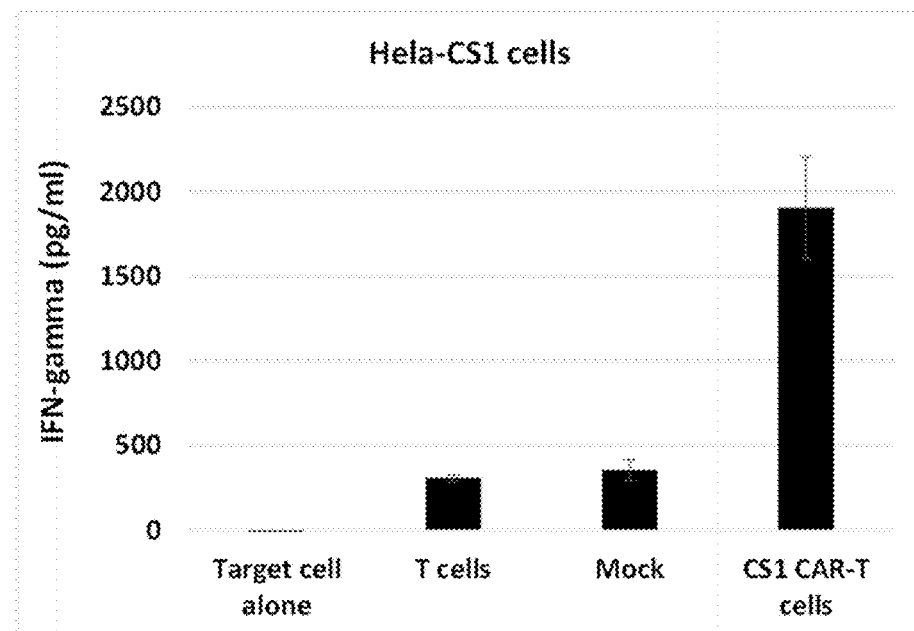
FIG. 16. CS1-41BB-CD3 (PMC717) secreted high level of IFN-gamma against Hela-CS1 cells. The IFN-gamma secreted by CAR-T cells is significantly higher than by Mock CAR-T cells. p=0.0087, CS1-41BB-CD3 CAR-T cells (PMC717) versus Mock CAR-T cells, Student's t-test.

Example 21. CS1-41BB-CD3 CAR T Cells (PMC 717) Secreted IFN-Gamma Against CS1-Positive Cells CS1-41BB-CD3 CAR-T cells (PMC717) secreted high level of IFN-gamma against CS1-positive cells (FIG. 16).

Example 22. Mice Treated with CS1 CAR-T Cells Prolonged the Survival of Mice

Figure 17:
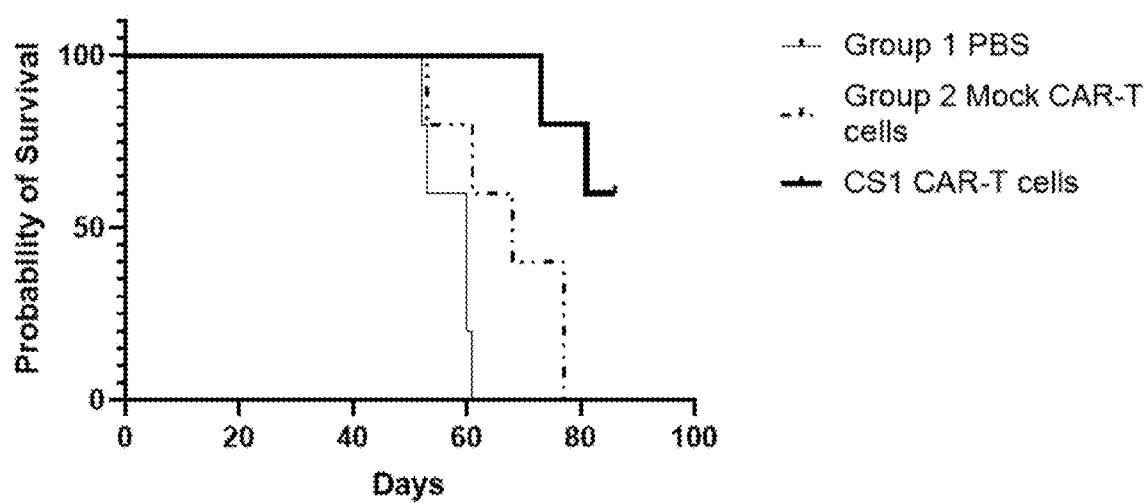
FIG. 17. Kaplan-Myer survival curve of mice treated with CS1-CAR-T cells (PMC 717).

We injected CS1-CAR-T cells (PMC717) to NSG mice next day after injecting MM1S cells and tested survival of CS1-CAR-T-treated mice versus Mock control cells (FIG. 17). CS1-CAR-T cells prolonged NSG mice survival than control mice (FIG. 17). CS1 CAR-T cells average survival was 82.4 days, which was significantly longer than control mock-CAR-T cells of 67 days and PBS-treated group of 57.2 days (p<0.05).

REFERENCES

[1] S. A. Grupp, M. Kalos, D. Barrett, R. Aplenc, D. L. Porter, S. R. Rheingold, D. T. Teachey, A. Chew, B. Hauck, J. F. Wright, M. C. Milone, B. L. Levine, and C. H. June, Chimeric antigen receptor-modified T cells for acute lymphoid leukemia. N Engl J Med 368 (2013) 1509-18.

[2] M. V. Maus, A. R. Haas, G. L. Beatty, S. M. Albelda, B. L. Levine, X. Liu, Y. Zhao, M. Kalos, and C. H. June, T cells expressing chimeric antigen receptors can cause anaphylaxis in humans. Cancer Immunol Res 1 (2013) 26-31.

[3] M. V. Maus, S. A. Grupp, D. L. Porter, and C. H. June, Antibody-modified T cells: CARs take the front seat for hematologic malignancies. Blood 123 (2014) 2625-35.

[4] V. Golubovskaya, and L. Wu, Different Subsets of T Cells, Memory, Effector Functions, and CAR-T Immunotherapy. Cancers (Basel) 8 (2016).

[5] R. Berahovich, H. Zhou, S. Xu, Y. Wei, J. Guan, J. Guan, H. Harto, S. Fu, K. Yang, S. Zhu, L. Li, L. Wu, and V. Golubovskaya, CAR-T Cells Based on Novel BCMA Monoclonal Antibody Block Multiple Myeloma Cell Growth. Cancers (Basel) 10 (2018).

What is claimed is:

1. A monoclonal anti-human CS1 antibody comprising $V_H$ having the amino acid of SEQ ID NO: 4 and $V_L$ having the amino acid of SEQ ID NO: 5.

2. A single-chain variable fragment (scFv) comprising $V_H$ having the amino acid of SEQ ID NO: 4 and $V_L$ having the amino acid of SEQ ID NO: 5.

3. The scFv of claim 2, further comprises a linker in between $V_H$ and $V_L$.

4. The scFv of claim 3, which has the amino acid sequence of SEQ ID NO: 3.

5. A chimeric antigen receptor fusion protein comprising from N-terminus to C-terminus:
   (i) the scFv of claim 2 or 4,
   (ii) a transmembrane domain,
   (iii) at least one co-stimulatory domains, and
   (iv) an activating domain.

6. The CAR according to claim 5, wherein the co-stimulatory domain is CD28 or 4-1BB.

7. The CAR according to claim 5, wherein the activation domain is CD3 zeta.

8. The CAR of claim 5, which has the amino acid sequence of SEQ ID NO: 18 or 20.

9. A nucleic acid encoding the CAR of claim 7 or 8.

10. T cells or natural killer cells modified to express the CAR of claim 5.

* * * * *

SEQUENCE LISTING

```
<160> NUMBER OF SEQ ID NOS: 20

<210> SEQ ID NO 1
<211> LENGTH: 335
<212> TYPE: PRT
<213> ORGANISM: Homo sapiens

<400> SEQUENCE: 1

Met Ala Gly Ser Pro Thr Cys Leu Thr Leu Ile Tyr Ile Leu Trp Gln
1               5                   10                  15

Leu Thr Gly Ser Ala Ala Ser Gly Pro Val Lys Glu Leu Val Gly Ser
            20                  25                  30

Val Gly Gly Ala Val Thr Phe Pro Leu Lys Ser Lys Val Lys Gln Val
```

```
                   35                  40                  45
Asp Ser Ile Val Trp Thr Phe Asn Thr Thr Pro Leu Val Thr Ile Gln
 50                  55                  60

Pro Glu Gly Gly Thr Ile Val Thr Gln Asn Arg Asn Arg Glu Arg
 65                  70                  75                  80

Val Asp Phe Pro Asp Gly Gly Tyr Ser Leu Lys Leu Ser Lys Leu Lys
                  85                  90                  95

Lys Asn Asp Ser Gly Ile Tyr Tyr Val Gly Ile Tyr Ser Ser Ser Leu
                 100                 105                 110

Gln Gln Pro Ser Thr Gln Glu Tyr Val Leu His Val Tyr Glu His Leu
                 115                 120                 125

Ser Lys Pro Lys Val Thr Met Gly Leu Gln Ser Asn Lys Asn Gly Thr
130                 135                 140

Cys Val Thr Asn Leu Thr Cys Cys Met Glu His Gly Glu Glu Asp Val
145                 150                 155                 160

Ile Tyr Thr Trp Lys Ala Leu Gly Gln Ala Ala Asn Glu Ser His Asn
                 165                 170                 175

Gly Ser Ile Leu Pro Ile Ser Trp Arg Trp Gly Glu Ser Asp Met Thr
                 180                 185                 190

Phe Ile Cys Val Ala Arg Asn Pro Val Ser Arg Asn Phe Ser Ser Pro
                 195                 200                 205

Ile Leu Ala Arg Lys Leu Cys Glu Gly Ala Ala Asp Asp Pro Asp Ser
210                 215                 220

Ser Met Val Leu Leu Cys Leu Leu Val Pro Leu Leu Leu Ser Leu
225                 230                 235                 240

Phe Val Leu Gly Leu Phe Leu Trp Phe Leu Lys Arg Glu Arg Gln Glu
                 245                 250                 255

Glu Tyr Ile Glu Glu Lys Lys Arg Val Asp Ile Cys Arg Glu Thr Pro
                 260                 265                 270

Asn Ile Cys Pro His Ser Gly Glu Asn Thr Glu Tyr Asp Thr Ile Pro
                 275                 280                 285

His Thr Asn Arg Thr Ile Leu Lys Glu Asp Pro Ala Asn Thr Val Tyr
290                 295                 300

Ser Thr Val Glu Ile Pro Lys Lys Met Glu Asn Pro His Ser Leu Leu
305                 310                 315                 320

Thr Met Pro Asp Thr Pro Arg Leu Phe Ala Tyr Glu Asn Val Ile
                 325                 330                 335

<210> SEQ ID NO 2
<211> LENGTH: 744
<212> TYPE: DNA
<213> ORGANISM: Mus musculus

<400> SEQUENCE: 2
gtccaacttc agcagtccgg gccggaagtc gtacgaccgg gagtcagcgt caagataagc      60
tgtaaaggct ctggctatac tttcaccgac tatgctatac actgggtcaa gcaatctcat     120
gccaaatcac tggagtggat tggggtcatt aatacgtaca acgggaacac taactacaat     180
caaaaattta agggtaaggc cactatgacg gtagataaaa gtagttcaac ggcctacatg     240
gagcttgcgc ggttgactag tgaagatagt gcgatatatt actgcactag aacaggctat     300
tattatggcc cttctcacta cttcgactat tggggggcagg gtacgacgtt gaccgttagc     360
tctggaggtg ggggctccgg tggaggtgga tcaggggggtg agggagcga tattgtgctc     420 acacaatcac cggcatcctt gactgttccc cttggtcaaa gagctacaat gtcatgcagg     480
```

-continued

```
gccagtaaat cagtctctac ttcaggatat agctacgtgc actggtatca acaaaaaccg    540
gggcagccac ctaagttgct gatatatctg ccagcaact tggagtctgg tgtgccagcc     600
cgcttttccg cgtccggttc aggaacagac tttacccctta acatacatcc cgtcgaggaa   660
gaggatgcag ctacttatta ttgccagcac agccgggagt tgccctggac ctttggtggg    720
ggtacgaaat tggagataaa gcgg                                           744
```

<210> SEQ ID NO 3
<211> LENGTH: 248
<212> TYPE: PRT
<213> ORGANISM: Mus musculus

<400> SEQUENCE: 3

Val Gln Leu Gln Gln Ser Gly Pro Glu Val Val Arg Pro Gly Val Ser
1               5                   10                  15

Val Lys Ile Ser Cys Lys Gly Ser Gly Tyr Thr Phe Thr Asp Tyr Ala
            20                  25                  30

Ile His Trp Val Lys Gln Ser His Ala Lys Ser Leu Glu Trp Ile Gly
        35                  40                  45

Val Ile Asn Thr Tyr Asn Gly Asn Thr Asn Tyr Asn Gln Lys Phe Lys
    50                  55                  60

Gly Lys Ala Thr Met Thr Val Asp Lys Ser Ser Ser Thr Ala Tyr Met
65                  70                  75                  80

Glu Leu Ala Arg Leu Thr Ser Glu Asp Ser Ala Ile Tyr Tyr Cys Thr
                85                  90                  95

Arg Thr Gly Tyr Tyr Tyr Gly Pro Ser His Tyr Phe Asp Tyr Trp Gly
            100                 105                 110

Gln Gly Thr Thr Leu Thr Val Ser Ser Gly Gly Gly Ser Gly Gly
        115                 120                 125

Gly Gly Ser Gly Gly Gly Ser Asp Ile Val Leu Thr Gln Ser Pro
    130                 135                 140

Ala Ser Leu Thr Val Ser Leu Gly Gln Arg Ala Thr Met Ser Cys Arg
145                 150                 155                 160

Ala Ser Lys Ser Val Ser Thr Ser Gly Tyr Ser Tyr Val His Trp Tyr
                165                 170                 175

Gln Gln Lys Pro Gly Gln Pro Pro Lys Leu Leu Ile Tyr Leu Ala Ser
            180                 185                 190

Asn Leu Glu Ser Gly Val Pro Ala Arg Phe Ser Ala Ser Gly Ser Gly
        195                 200                 205

Thr Asp Phe Thr Leu Asn Ile His Pro Val Glu Glu Asp Ala Ala
    210                 215                 220

Thr Tyr Tyr Cys Gln His Ser Arg Glu Leu Pro Trp Thr Phe Gly Gly
225                 230                 235                 240

Gly Thr Lys Leu Glu Ile Lys Arg
                245

<210> SEQ ID NO 4
<211> LENGTH: 121
<212> TYPE: PRT
<213> ORGANISM: Mus musculus

<400> SEQUENCE: 4

Val Gln Leu Gln Gln Ser Gly Pro Glu Val Val Arg Pro Gly Val Ser
1               5                   10                  15

Val Lys Ile Ser Cys Lys Gly Ser Gly Tyr Thr Phe Thr Asp Tyr Ala

```
            20                  25                  30
Ile His Trp Val Lys Gln Ser His Ala Lys Ser Leu Glu Trp Ile Gly
        35                  40                  45

Val Ile Asn Thr Tyr Asn Gly Asn Thr Asn Tyr Asn Gln Lys Phe Lys
    50                  55                  60

Gly Lys Ala Thr Met Thr Val Asp Lys Ser Ser Ser Thr Ala Tyr Met
65                  70                  75                  80

Glu Leu Ala Arg Leu Thr Ser Glu Asp Ser Ala Ile Tyr Tyr Cys Thr
                85                  90                  95

Arg Thr Gly Tyr Tyr Tyr Gly Pro Ser His Tyr Phe Asp Tyr Trp Gly
            100                 105                 110

Gln Gly Thr Thr Leu Thr Val Ser Ser
        115                 120

<210> SEQ ID NO 5
<211> LENGTH: 112
<212> TYPE: PRT
<213> ORGANISM: Mus musculus

<400> SEQUENCE: 5

Asp Ile Val Leu Thr Gln Ser Pro Ala Ser Leu Thr Val Ser Leu Gly
1               5                   10                  15

Gln Arg Ala Thr Met Ser Cys Arg Ala Ser Lys Ser Val Ser Thr Ser
            20                  25                  30

Gly Tyr Ser Tyr Val His Trp Tyr Gln Gln Lys Pro Gly Gln Pro Pro
        35                  40                  45

Lys Leu Leu Ile Tyr Leu Ala Ser Asn Leu Glu Ser Gly Val Pro Ala
    50                  55                  60

Arg Phe Ser Ala Ser Gly Ser Gly Thr Asp Phe Thr Leu Asn Ile His
65                  70                  75                  80

Pro Val Glu Glu Glu Asp Ala Ala Thr Tyr Tyr Cys Gln His Ser Arg
                85                  90                  95

Glu Leu Pro Trp Thr Phe Gly Gly Gly Thr Lys Leu Glu Ile Lys Arg
            100                 105                 110

<210> SEQ ID NO 6
<211> LENGTH: 15
<212> TYPE: PRT
<213> ORGANISM: Artificial Sequence
<220> FEATURE:
<223> OTHER INFORMATION: Synthetic

<400> SEQUENCE: 6

Gly Gly Gly Gly Ser Gly Gly Gly Gly Ser Gly Gly Gly Gly Ser
1               5                   10                  15

<210> SEQ ID NO 7
<211> LENGTH: 63
<212> TYPE: DNA
<213> ORGANISM: Homo sapiens

<400> SEQUENCE: 7
atggccttac cagtgaccgc cttgctcctg ccgctggcct tgctgctcca cgccgccagg    60
ccg                                                                 63

<210> SEQ ID NO 8
<211> LENGTH: 21
<212> TYPE: PRT
<213> ORGANISM: Homo sapiens
```

<400> SEQUENCE: 8

Met Ala Leu Pro Val Thr Ala Leu Leu Pro Leu Ala Leu Leu
1               5                   10                  15

His Ala Ala Arg Pro
            20

<210> SEQ ID NO 9
<211> LENGTH: 141
<212> TYPE: DNA
<213> ORGANISM: Homo sapiens

<400> SEQUENCE: 9
aagcccacca cgacgccagc gccgcgacca ccaacaccgg cgcccaccat cgcgtcgcag      60
cccctgtccc tgcgcccaga ggcgagccgg ccagcggcgg ggggcgcagt gcacacgagg     120
gggctggact tcgccagtga t                                               141

<210> SEQ ID NO 10
<211> LENGTH: 47
<212> TYPE: PRT
<213> ORGANISM: Homo sapiens

<400> SEQUENCE: 10

Lys Pro Thr Thr Thr Pro Ala Pro Arg Pro Pro Thr Pro Ala Pro Thr
1               5                   10                  15

Ile Ala Ser Gln Pro Leu Ser Leu Arg Pro Glu Ala Ser Arg Pro Ala
            20                  25                  30

Ala Gly Gly Ala Val His Thr Arg Gly Leu Asp Phe Ala Ser Asp
        35                  40                  45

<210> SEQ ID NO 11
<211> LENGTH: 81
<212> TYPE: DNA
<213> ORGANISM: Homo sapiens

<400> SEQUENCE: 11
ttttgggtgc tggtggtggt tggtggagtc ctggcttgct atagcttgct agtaacagtg      60
gcctttatta ttttctgggt g                                                81

<210> SEQ ID NO 12
<211> LENGTH: 27
<212> TYPE: PRT
<213> ORGANISM: Homo sapiens

<400> SEQUENCE: 12

Phe Trp Val Leu Val Val Val Gly Gly Val Leu Ala Cys Tyr Ser Leu
1               5                   10                  15

Leu Val Thr Val Ala Phe Ile Ile Phe Trp Val
            20                  25

<210> SEQ ID NO 13
<211> LENGTH: 123
<212> TYPE: DNA
<213> ORGANISM: Homo sapiens

<400> SEQUENCE: 13
aggagtaaga ggagcaggct cctgcacagt gactacatga acatgactcc ccgccgcccc      60
gggcccaccc gcaagcatta ccagccctat gccccaccac gcgacttcgc agcctatcgc     120
tcc                                                                   123

<210> SEQ ID NO 14
<211> LENGTH: 41
<212> TYPE: PRT
<213> ORGANISM: Homo sapiens

<400> SEQUENCE: 14

Arg Ser Lys Arg Ser Arg Leu Leu His Ser Asp Tyr Met Asn Met Thr
1               5                   10                  15

Pro Arg Arg Pro Gly Pro Thr Arg Lys His Tyr Gln Pro Tyr Ala Pro
            20                  25                  30

Pro Arg Asp Phe Ala Ala Tyr Arg Ser
        35                  40

<210> SEQ ID NO 15
<211> LENGTH: 342
<212> TYPE: DNA
<213> ORGANISM: Homo sapiens

<400> SEQUENCE: 15
agagtgaagt tcagcaggag cgcagacgcc cccgcgtacc agcagggcca gaaccagctc      60
tataacgagc tcaatctagg acgaagagag gagtacgatg ttttggacaa gagacgtggc     120
cgggaccctg agatgggggg aaagccgcag agaaggaaga accctcagga aggcctgtac     180
aatgaactgc agaaagataa gatggcgag gcctacagtg agattgggat gaaaggcgag      240
cgccggaggg gcaaggggca cgatggcctt taccagggtc tcagtacagc caccaaggac     300
acctacgacg cccttcacat gcaggccctg ccccctcgct aa                        342

<210> SEQ ID NO 16
<211> LENGTH: 113
<212> TYPE: PRT
<213> ORGANISM: Homo sapiens

<400> SEQUENCE: 16

Arg Val Lys Phe Ser Arg Ser Ala Asp Ala Pro Ala Tyr Gln Gln Gly
1               5                   10                  15

Gln Asn Gln Leu Tyr Asn Glu Leu Asn Leu Gly Arg Arg Glu Glu Tyr
            20                  25                  30

Asp Val Leu Asp Lys Arg Arg Gly Arg Asp Pro Glu Met Gly Gly Lys
        35                  40                  45

Pro Gln Arg Arg Lys Asn Pro Gln Glu Gly Leu Tyr Asn Glu Leu Gln
    50                  55                  60

Lys Asp Lys Met Ala Glu Ala Tyr Ser Glu Ile Gly Met Lys Gly Glu
65                  70                  75                  80

Arg Arg Arg Gly Lys Gly His Asp Gly Leu Tyr Gln Gly Leu Ser Thr
                85                  90                  95

Ala Thr Lys Asp Thr Tyr Asp Ala Leu His Met Gln Ala Leu Pro Pro
            100                 105                 110

Arg

<210> SEQ ID NO 17
<211> LENGTH: 1512
<212> TYPE: DNA
<213> ORGANISM: Mus musculus

<400> SEQUENCE: 17
atggccttac cagtgaccgc cttgctcctg ccgctggcct tgctgctcca cgccgccagg      60

| | |
|---|---|
| ccggctagcg tccaacttca gcagtccggg ccggaagtcg tacgaccggg agtcagcgtc | 120 |
| aagataagct gtaaaggctc tggctatact ttcaccgact atgctataca ctgggtcaag | 180 |
| caatctcatg ccaaatcact ggagtggatt ggggtcatta atacgtacaa cgggaacact | 240 |
| aactacaatc aaaaatttaa gggtaaggcc actatgacgg tagataaaag tagttcaacg | 300 |
| gcctacatgg agcttgcgcg gttgactagt gaagatagtg cgatatatta ctgcactaga | 360 |
| acaggctatt attatggccc ttctcactac ttcgactatt gggggcaggg tacgacgttg | 420 |
| accgttagct ctggaggtgg gggctccggt ggaggtggat caggggggtgg agggagcgat | 480 |
| attgtgctca cacaatcacc ggcatccttg actgtttccc ttggtcaaag agctacaatg | 540 |
| tcatgcaggg ccagtaaatc agtctctact tcaggatata gctacgtgca ctggtatcaa | 600 |
| caaaaaccgg ggcagccacc taagttgctg atatatctgg ccagcaactt ggagtctggt | 660 |
| gtgccagccc gcttttccgc gtccggttca ggaacagact ttacccttaa catacatccc | 720 |
| gtcgaggaag aggatgcagc tacttattat tgccagcaca gccggagtt gccctggacc | 780 |
| tttggtgggg gtacgaaatt ggagataaag cggctcgaga agcccaccac gacgccagcg | 840 |
| ccgcgaccac caacaccggc gcccaccatc gcgtcgcagc ccctgtccct gcgcccagag | 900 |
| gcgagccggc cagcggcggg gggcgcagtg cacacgaggg ggctggactt cgccagtgat | 960 |
| aagccctttt gggtgctggt ggtggttggt ggagtcctgg cttgctatag cttgctagta | 1020 |
| acagtggcct ttattatttt ctgggtgagg agtaagagga gcaggctcct gcacagtgac | 1080 |
| tacatgaaca tgactccccg ccgccccggg cccacccgca agcattacca gccctatgcc | 1140 |
| ccaccacgcg acttcgcagc ctatcgctcc agagtgaagt tcagcaggag cgcagacgcc | 1200 |
| cccgcgtacc agcagggcca gaaccagctc tataacgagc tcaatctagg acgaagagag | 1260 |
| gagtacgatg ttttggacaa gagacgtggc cgggaccctg agatgggggg aaagccgcag | 1320 |
| agaaggaaga accctcagga aggcctgtac aatgaactgc agaaagataa gatggcggag | 1380 |
| gcctacagtg agattgggat gaaaggcgag cgccggaggg gcaaggggca cgatggcctt | 1440 |
| taccagggtc tcagtacagc caccaaggac acctacgacg cccttcacat gcaggccctg | 1500 |
| cccccctcgct aa | 1512 |

<210> SEQ ID NO 18
<211> LENGTH: 503
<212> TYPE: PRT
<213> ORGANISM: Mus musculus

<400> SEQUENCE: 18

```
Met Ala Leu Pro Val Thr Ala Leu Leu Leu Pro Leu Ala Leu Leu Leu
1               5                   10                  15

His Ala Ala Arg Pro Ala Ser Val Gln Leu Gln Gln Ser Gly Pro Glu
            20                  25                  30

Val Val Arg Pro Gly Val Ser Val Lys Ile Ser Cys Lys Gly Ser Gly
        35                  40                  45

Tyr Thr Phe Thr Asp Tyr Ala Ile His Trp Val Lys Gln Ser His Ala
    50                  55                  60

Lys Ser Leu Glu Trp Ile Gly Val Ile Asn Thr Tyr Asn Gly Asn Thr
65                  70                  75                  80

Asn Tyr Asn Gln Lys Phe Lys Gly Lys Ala Thr Met Thr Val Asp Lys
                85                  90                  95

Ser Ser Ser Thr Ala Tyr Met Glu Leu Ala Arg Leu Thr Ser Glu Asp
            100                 105                 110
```

```
Ser Ala Ile Tyr Tyr Cys Thr Arg Thr Gly Tyr Tyr Gly Pro Ser
            115                 120                 125

His Tyr Phe Asp Tyr Trp Gly Gln Gly Thr Thr Leu Thr Val Ser Ser
130                 135                 140

Gly Gly Gly Gly Ser Gly Gly Gly Ser Gly Gly Gly Ser Asp
145                 150                 155                 160

Ile Val Leu Thr Gln Ser Pro Ala Ser Leu Thr Val Ser Leu Gly Gln
                165                 170                 175

Arg Ala Thr Met Ser Cys Arg Ala Ser Lys Ser Val Ser Thr Ser Gly
            180                 185                 190

Tyr Ser Tyr Val His Trp Tyr Gln Gln Lys Pro Gly Gln Pro Pro Lys
        195                 200                 205

Leu Leu Ile Tyr Leu Ala Ser Asn Leu Glu Ser Gly Val Pro Ala Arg
    210                 215                 220

Phe Ser Ala Ser Gly Ser Gly Thr Asp Phe Thr Leu Asn Ile His Pro
225                 230                 235                 240

Val Glu Glu Glu Asp Ala Ala Thr Tyr Tyr Cys Gln His Ser Arg Glu
                245                 250                 255

Leu Pro Trp Thr Phe Gly Gly Gly Thr Lys Leu Glu Ile Lys Arg Leu
            260                 265                 270

Glu Lys Pro Thr Thr Thr Pro Ala Pro Arg Pro Pro Thr Pro Ala Pro
        275                 280                 285

Thr Ile Ala Ser Gln Pro Leu Ser Leu Arg Pro Glu Ala Ser Arg Pro
    290                 295                 300

Ala Ala Gly Gly Ala Val His Thr Arg Gly Leu Asp Phe Ala Ser Asp
305                 310                 315                 320

Lys Pro Phe Trp Val Leu Val Val Val Gly Gly Val Leu Ala Cys Tyr
                325                 330                 335

Ser Leu Leu Val Thr Val Ala Phe Ile Ile Phe Trp Val Arg Ser Lys
            340                 345                 350

Arg Ser Arg Leu Leu His Ser Asp Tyr Met Asn Met Thr Pro Arg Arg
        355                 360                 365

Pro Gly Pro Thr Arg Lys His Tyr Gln Pro Tyr Ala Pro Pro Arg Asp
    370                 375                 380

Phe Ala Ala Tyr Arg Ser Arg Val Lys Phe Ser Arg Ser Ala Asp Ala
385                 390                 395                 400

Pro Ala Tyr Gln Gln Gly Gln Asn Gln Leu Tyr Asn Glu Leu Asn Leu
                405                 410                 415

Gly Arg Arg Glu Glu Tyr Asp Val Leu Asp Lys Arg Gly Arg Asp
            420                 425                 430

Pro Glu Met Gly Gly Lys Pro Gln Arg Arg Lys Asn Pro Gln Glu Gly
        435                 440                 445

Leu Tyr Asn Glu Leu Gln Lys Asp Lys Met Ala Glu Ala Tyr Ser Glu
    450                 455                 460

Ile Gly Met Lys Gly Glu Arg Arg Arg Gly Lys Gly His Asp Gly Leu
465                 470                 475                 480

Tyr Gln Gly Leu Ser Thr Ala Thr Lys Asp Thr Tyr Asp Ala Leu His
                485                 490                 495

Met Gln Ala Leu Pro Pro Arg
            500
```

<210> SEQ ID NO 19
<211> LENGTH: 1515
<212> TYPE: DNA

-continued

<213> ORGANISM: Mus musculus

<400> SEQUENCE: 19

| | | | | | |
|---|---|---|---|---|---|
| atggccttac | cagtgaccgc | cttgctcctg | ccgctggcct | tgctgctcca | cgccgccagg | 60 |
| ccggctagcg | tccaacttca | gcagtccggg | ccggaagtcg | tacgaccggg | agtcagcgtc | 120 |
| aagataagct | gtaaaggctc | tggctatact | ttcaccgact | atgctataca | ctgggtcaag | 180 |
| caatctcatg | ccaaatcact | ggagtggatt | ggggtcatta | atacgtacaa | cgggaacact | 240 |
| aactacaatc | aaaaatttaa | gggtaaggcc | actatgacgg | tagataaaag | tagttcaacg | 300 |
| gcctacatgg | agcttgcgcg | gttgactagt | gaagatagtg | cgatatatta | ctgcactaga | 360 |
| acaggctatt | attatggccc | ttctcactac | ttcgactatt | gggggcaggg | tacgacgttg | 420 |
| accgttagct | ctggaggtgg | gggctccggt | ggaggtggat | caggggggtgg | agggagcgat | 480 |
| attgtgctca | cacaatcacc | ggcatccttg | actgtttccc | ttggtcaaag | agctacaatg | 540 |
| tcatgcaggg | ccagtaaatc | agtctctact | tcaggatata | gctacgtgca | ctggtatcaa | 600 |
| caaaaaccgg | ggcagccacc | taagttgctg | atatatctgg | ccagcaactt | ggagtctggt | 660 |
| gtgccagccc | gcttttccgc | gtccggttca | ggaacagact | ttacccttaa | catacatccc | 720 |
| gtcgaggaag | aggatgcagc | tacttattat | tgccagcaca | gccgggagtt | gccctggacc | 780 |
| tttggtgggg | gtacgaaatt | ggagataaag | cggctcgaga | agcccaccac | gacgccagcg | 840 |
| ccgcgaccac | caacaccggc | gcccaccatc | gcgtcgcagc | ccctgtccct | gcgcccagag | 900 |
| gcgagccggc | cagcggcggg | gggcgcagtg | cacacgaggg | ggctggactt | cgccagtgat | 960 |
| aagccctttt | gggtgctggt | ggtggttggt | ggagtcctgg | cttgctatag | cttgctagta | 1020 |
| acagtggcct | ttattatttt | ctgggtgaaa | cggggcagaa | agaaactcct | gtatatattc | 1080 |
| aaacaaccat | ttatgagacc | agtacaaact | actcaagagg | aagatggctg | tagctgccga | 1140 |
| tttccagaag | aagaagaagg | aggatgtgaa | ctgagagtga | agttcagcag | gagcgcagac | 1200 |
| gcccccgcgt | accagcaggg | ccagaaccag | ctctataacg | agctcaatct | aggacgaaga | 1260 |
| gaggagtacg | atgttttgga | caagagacgt | ggccgggacc | ctgagatggg | gggaaagccg | 1320 |
| cagagaagga | agaaccctca | ggaaggcctg | tacaatgaac | tgcagaaaga | taagatggcg | 1380 |
| gaggcctaca | gtgagattgg | gatgaaaggc | gagcgccgga | ggggcaaggg | gcacgatggc | 1440 |
| ctttaccagg | gtctcagtac | agccaccaag | gacacctacg | acgcccttca | catgcaggcc | 1500 |
| ctgccccctc | gctaa | | | | | 1515 |

<210> SEQ ID NO 20
<211> LENGTH: 504
<212> TYPE: PRT
<213> ORGANISM: Mus musculus

<400> SEQUENCE: 20

Met Ala Leu Pro Val Thr Ala Leu Leu Leu Pro Leu Ala Leu Leu Leu
1               5                   10                  15

His Ala Ala Arg Pro Ala Ser Val Gln Leu Gln Gln Ser Gly Pro Glu
            20                  25                  30

Val Val Arg Pro Gly Val Ser Val Lys Ile Ser Cys Lys Gly Ser Gly
        35                  40                  45

Tyr Thr Phe Thr Asp Tyr Ala Ile His Trp Val Lys Gln Ser His Ala
    50                  55                  60

Lys Ser Leu Glu Trp Ile Gly Val Ile Asn Thr Tyr Asn Gly Asn Thr
65                  70                  75                  80

-continued

```
Asn Tyr Asn Gln Lys Phe Lys Gly Lys Ala Thr Met Thr Val Asp Lys
                 85                  90                  95

Ser Ser Ser Thr Ala Tyr Met Glu Leu Ala Arg Leu Thr Ser Glu Asp
            100                 105                 110

Ser Ala Ile Tyr Tyr Cys Thr Arg Thr Gly Tyr Tyr Gly Pro Ser
        115                 120                 125

His Tyr Phe Asp Tyr Trp Gly Gln Gly Thr Thr Leu Thr Val Ser Ser
130                 135                 140

Gly Gly Gly Gly Ser Gly Gly Gly Ser Gly Gly Gly Ser Asp
145                 150                 155                 160

Ile Val Leu Thr Gln Ser Pro Ala Ser Leu Thr Val Ser Leu Gly Gln
                165                 170                 175

Arg Ala Thr Met Ser Cys Arg Ala Ser Lys Ser Val Ser Thr Ser Gly
            180                 185                 190

Tyr Ser Tyr Val His Trp Tyr Gln Gln Lys Pro Gly Gln Pro Pro Lys
        195                 200                 205

Leu Leu Ile Tyr Leu Ala Ser Asn Leu Glu Ser Gly Val Pro Ala Arg
    210                 215                 220

Phe Ser Ala Ser Gly Ser Gly Thr Asp Phe Thr Leu Asn Ile His Pro
225                 230                 235                 240

Val Glu Glu Glu Asp Ala Ala Thr Tyr Tyr Cys Gln His Ser Arg Glu
                245                 250                 255

Leu Pro Trp Thr Phe Gly Gly Gly Thr Lys Leu Glu Ile Lys Arg Leu
            260                 265                 270

Glu Lys Pro Thr Thr Pro Ala Pro Arg Pro Thr Pro Ala Pro
        275                 280                 285

Thr Ile Ala Ser Gln Pro Leu Ser Leu Arg Pro Glu Ala Ser Arg Pro
    290                 295                 300

Ala Ala Gly Gly Ala Val His Thr Arg Gly Leu Asp Phe Ala Ser Asp
305                 310                 315                 320

Lys Pro Phe Trp Val Leu Val Val Val Gly Gly Val Leu Ala Cys Tyr
                325                 330                 335

Ser Leu Leu Val Thr Val Ala Phe Ile Ile Phe Trp Val Lys Arg Gly
            340                 345                 350

Arg Lys Lys Leu Leu Tyr Ile Phe Lys Gln Pro Phe Met Arg Pro Val
        355                 360                 365

Gln Thr Thr Gln Glu Glu Asp Gly Cys Ser Cys Arg Phe Pro Glu Glu
    370                 375                 380

Glu Glu Gly Gly Cys Glu Leu Arg Val Lys Phe Ser Arg Ser Ala Asp
385                 390                 395                 400

Ala Pro Ala Tyr Gln Gln Gly Gln Asn Gln Leu Tyr Asn Glu Leu Asn
                405                 410                 415

Leu Gly Arg Arg Glu Glu Tyr Asp Val Leu Asp Lys Arg Gly Arg
            420                 425                 430

Asp Pro Glu Met Gly Gly Lys Pro Gln Arg Arg Lys Asn Pro Gln Glu
        435                 440                 445

Gly Leu Tyr Asn Glu Leu Gln Lys Asp Lys Met Ala Glu Ala Tyr Ser
    450                 455                 460

Glu Ile Gly Met Lys Gly Glu Arg Arg Gly Lys Gly His Asp Gly
465                 470                 475                 480
```

```
Leu Tyr Gln Gly Leu Ser Thr Ala Thr Lys Asp Thr Tyr Asp Ala Leu
            485                 490                 495
His Met Gln Ala Leu Pro Pro Arg
            500
```